(12) United States Patent
Monda et al.

(10) Patent No.: US 12,110,134 B1
(45) Date of Patent: *Oct. 8, 2024

(54) ORBITAL RENDEZVOUS TECHNIQUES

(71) Applicant: United Launch Alliance, L.L.C., Centennial, CO (US)

(72) Inventors: Eric W. Monda, Highlands Ranch, CO (US); Bernard F. Kutter, Golden, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/739,535

(22) Filed: May 9, 2022

Related U.S. Application Data

(63) Continuation of application No. 16/400,383, filed on May 1, 2019, now Pat. No. 11,377,237.

(51) Int. Cl.
*B64G 1/64* (2006.01)
*B64G 1/24* (2006.01)

(52) U.S. Cl.
CPC ........... *B64G 1/646* (2013.01); *B64G 1/2427* (2023.08)

(58) Field of Classification Search
CPC ....... B64G 1/646; B64G 1/242; B64G 1/2427
See application file for complete search history.

(56) References Cited

U.S. PATENT DOCUMENTS

| | | | |
|---|---|---|---|
| 6,182,928 B1 * | 2/2001 | Wagner | B64G 1/2427 244/158.5 |
| 2003/0029969 A1 * | 2/2003 | Turner | B64G 1/2427 244/158.9 |
| 2021/0061494 A1 * | 3/2021 | Belieres Montero | B64G 1/002 |

* cited by examiner

*Primary Examiner* — Magdalena Topolski
(74) *Attorney, Agent, or Firm* — Sheridan Ross P.C.

(57) ABSTRACT

A method of achieving orbital rendezvous with a target satellite includes launching a spacecraft with a launch vehicle at an optimal time; steering the launch vehicle out-of-plane based on the orbital elements of the target satellite's orbit; and entering a predetermined rendezvous envelope of the target satellite before the target satellite completes one complete orbit from the target satellite's position at the optimal time.

19 Claims, 11 Drawing Sheets

ORBITAL RENDEZVOUS TECHNIQUES

CROSS-REFERENCE TO RELATED APPLICATIONS

This application claims the benefit of U.S. patent application Ser. No. 16/400,383, filed May 1, 2019, the entirety of which is incorporated herein by reference.

FIELD

The present disclosure relates to systems and methods for achieving orbital rendezvous, and more particularly to systems and methods for efficiently launching a vehicle from Earth to rendezvous with an orbiting satellite.

BACKGROUND

The International Space Station, or ISS, orbits the Earth at an altitude of about 400 kilometers (250 miles), which is classified as low Earth orbit. The ISS completes about fifteen and a half orbits per day. The combined effects of the Earth's rotation and the Earth's oblateness cause the ground track of the ISS orbit to shift at a rate of about 365 degrees per day.

Crew members and supplies are regularly delivered to the ISS via a launch system that typically comprises a launch vehicle configured to launch a spacecraft into space. The launch vehicle may separate from the spacecraft at any time after launch and before docking or berthing with the ISS. The launch system must be launched during a launch window to ensure that orbital rendezvous with the orbiting ISS is possible. The launch window is currently based on the time at which the orbital plane of the ISS crosses over the location of the launch site. Depending on the actual time of launch, a small amount of out-of-plane steering may be conducted during launch to align the launch vehicle with the orbital plane of the ISS.

The actual position of the ISS at the optimal time of launch varies. The phase angle between an arriving spacecraft and the ISS can be anywhere from 0 to 360 degrees on a given day. Depending on the phase angle between the launch system at the time of launch and the location of the ISS, the amount of time required for the launched spacecraft to reach the ISS can be extensive. Typical times range from about one day to about five days. On some days, the phase angle is sufficiently large that the spacecraft would not be able to catch up to the ISS within an acceptable time period (which may be determined, for example, by the presence of time-critical experiments on board, and/or by the amount of food, water, and/or oxygen on board if the launch vehicle is carrying astronauts or other biologicals), resulting in launch blackout dates.

Currently, the launch vehicle typically carries out a 1-burn ascent to insert the spacecraft into a phasing orbit lower than the ISS, in which the spacecraft is traveling with a faster orbital period than the ISS and so gradually catches up to the ISS. When the spacecraft is properly aligned with the ISS, it executes one or more engine burns to transition into the same orbit as the ISS, after which the spacecraft can execute final docking or berthing maneuvers.

In some instances, a launch vehicle makes a 1-burn ascent to orbital rendezvous with the ISS. Launch opportunities for such 1-burn ascents as currently conducted, however, are timed to avoid out-of-plane steering, and as a result only occur rarely, when the orbital plane of the ISS is aligned with the launch site at the time the ISS is positioned at a particular location within that orbital plane.

The procedures described above for achieving orbital rendezvous with the ISS are applicable to achieving orbital rendezvous with other satellites as well.

U.S. Pat. No. 5,595,360 to Spitzer, entitled "Optimal Transfer Orbit Trajectory Using Electric Propulsion," describes a normal launch sequence terminating with a spacecraft being placed in an elliptical injection orbit. The target orbit is a geosynchronous orbit. Thrusters (preferably electrical, but possibly chemical) are fired during consecutive passes around the apogee to raise the perigee, decrease the eccentricity, and adjust the angle of inclination of the orbit. Once the spacecraft has reached the correct orbital plane, it is reoriented to an in-plane attitude, and the thrusters are fired continuously to raise the perigee and lower the apogee while maintaining a nearly constant semi-major axis of each intermediate orbit (equal to the semi-major axis of the desired geosynchronous orbit) until the desired geosynchronous orbit is reached.

U.S. Pat. No. 6,543,723 to Oh, entitled "Electric Orbit Raising with Variable Thrust," describes the use of variable thrust levels in electric orbit raising to optimize the payload mass delivered to orbit. More specifically, once a satellite is injected into a transfer orbit by a launch vehicle, a chemical thruster is used to raise the orbit of the satellite from the transfer orbit to an intermediate orbit. Electric propulsion is then used to raise the orbit of the satellite from the intermediate orbit to a final geosynchronous orbit. The electric thrusters are throttled to produce variable thrust levels so that they operate at an optimum specific impulse level to optimize the mass of the satellite delivered into orbit.

In the context of a reusable space vehicle that can move between orbits for rescue missions and/or for satellite repair and maintenance, U.S. Pat. No. 6,364,252 to Anderman, entitled "Method of Using Dwell Times in Intermediate Orbits to Optimize Orbital Transfers and Method and Apparatus for Satellite Repair," describes a method of orbital transfer that involves dropping from a first orbit to a second, lower orbit until a minimum energy launch window to a target orbit is reached, and then transferring to the target orbit.

The article "Analysis of Targeted Method for Closed-Loop Guidance of a Multi-Stage Space Launch Vehicle" by Song et al., Advances in Space Research 57 (2016), pp. 1494-1507, compares the performance of two targeting methods for a typical multi-stage launch vehicle: a first targeting method in which each stage has a separate target; and a second targeting method in which there is only a single target in the final stage. The article concludes that while guidance commands generated from both methods are almost identical, the single target algorithm shows superior performance for off-nominal conditions caused by the main performance uncertainties of a typical multi-stage launch vehicle. This is because with multiple targeting guidance, abrupt command changes are made to compensate for accumulated trajectory errors during second-stage flight, while the single targeting algorithm does not produce such sudden changes due to the relatively far target in the final stage.

SUMMARY

Current methods for rendezvousing with satellites, such as the ISS, are based on launch of a launch vehicle/spacecraft when the orbital plane of the target satellite passes through the launch site. At that particular moment, however, the target satellite may be anywhere along its orbit. Depending on the phase angle between the target satellite and the launch vehicle/spacecraft, the amount of time needed for the spacecraft to reach proper alignment with the target satellite may be, and often is, measured in days.

According to systems and methods of the present disclosure, an optimal launch time for achieving orbital rendezvous with a satellite is determined based on the satellite's orbital plane as well as the satellite's position within that orbital plane. As a result, the systems and methods of the present disclosure enable a spacecraft to begin the terminal rendezvous sequence with the targeted object within minutes or hours, with launch opportunities available on a daily basis.

DETAILED DESCRIPTION

Figure 1A:
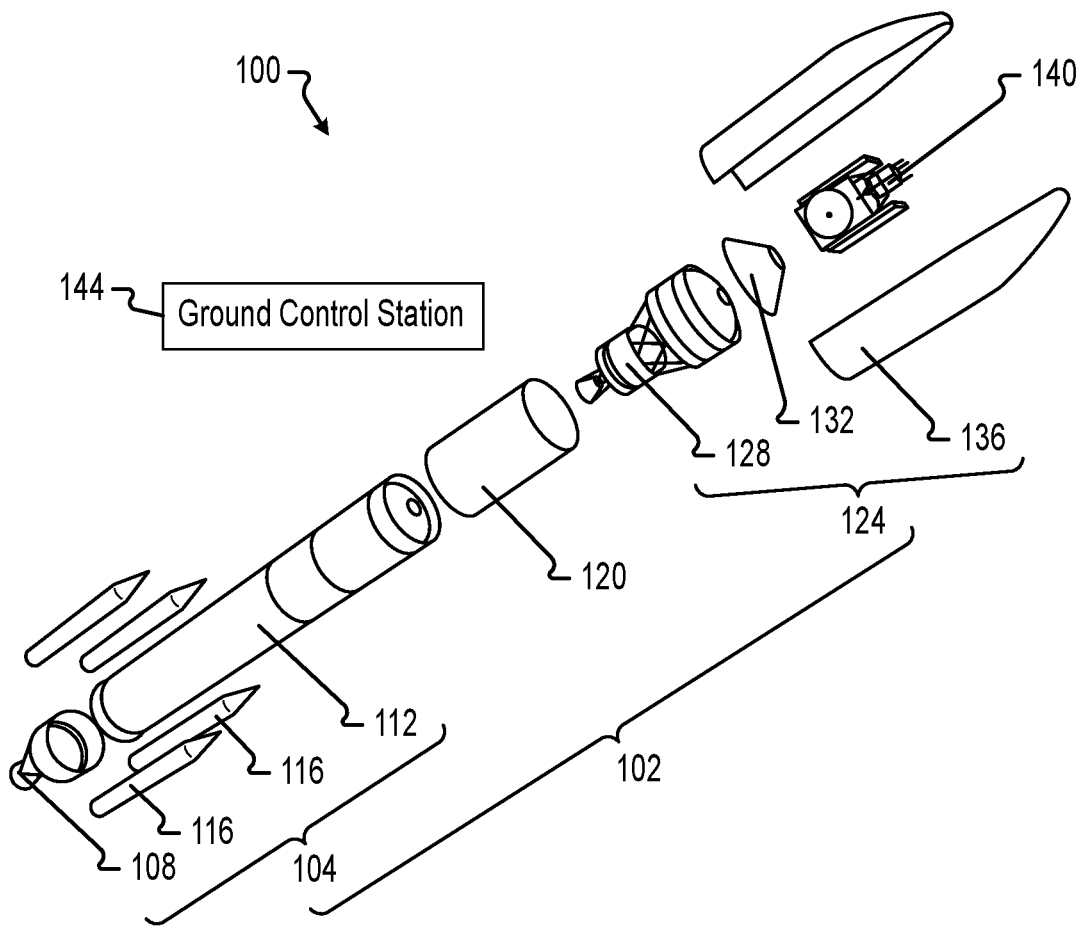
FIG. 1A shows a launch system according to embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

FIG. 1A depicts a launch system 100, including an exploded view of a launch vehicle 102 (which comprises a first stage 104, an interstage 120, and a second stage 124), as well as a spacecraft 140 and a ground control station 144. Each of the launch vehicle 102, the spacecraft 140, and the ground control station 144 may comprise a control unit 150 such as that shown in FIG. 1B.

The first stage 104 comprises a liquid fuel rocket engine 108, one or more liquid fuel tanks 112, and a plurality of solid rocket boosters 116. In some embodiments, the first stage 104 may comprise only one or more solid rockets, while in other embodiments, the first stage 104 may comprise only one or more liquid fuel rocket engines with associated liquid fuel tanks. The solid rocket boosters 116 may be configured to separate from the remainder of the first stage 104 once their solid rocket fuel is spent.

The interstage 120 provides a structural connection between the first stage 104 and the second stage 124, while also providing an aerodynamic fairing between the two stages. Once the first stage 104 has completed its burn(s) and/or once all rocket fuel in the first stage 104 is spent, the first stage 104 and the interstage 120 separate from the second stage 124.

The second stage 124 comprises a second stage rocket engine 128 (and associated fuel tank(s)), a payload attach fitting 132 for securing the spacecraft 140 to the second stage 124, and one or more payload fairings 136 that provide an aerodynamic protective cover for the spacecraft 140 while the launch vehicle 102 is travelling through Earth's atmosphere. The second stage 124 may be configured to ignite immediately upon or shortly after separation of the interstage 120 from the second stage 124, or the second stage 124 may be configured to ignite only upon receipt of a control signal from an on-board or ground-based control unit. The second stage 124 may be configured to separate from the spacecraft 140 upon receipt of a separation control signal from an on-board or ground-based control unit, and/or once the second stage 124 has completed its burn(s) or when all of the available fuel in the second stage 124 has been spent. The payload fairings 136 may be configured to separate from the second stage 124, whether automatically or upon receipt of a corresponding control signal, at any time after the launch vehicle 102 (or a portion thereof) has reached space.

The rocket engines 108 and 128 may comprise movable nozzles for vectoring the thrust produced, thereby steering the launch vehicle 102 and the second stage 124, respectively (or any other portion of the launch vehicle 102).

The spacecraft 140 may be a manned or unmanned vehicle. The spacecraft 140 may comprise launch system control systems (e.g., for controlling one or more aspects of the entire launch system 100), spacecraft control systems, life support systems, climate control systems, energy generation and/or conversion systems, power distribution systems, propulsion systems, rendezvous systems, docking/berthing systems, and other systems appropriate for the particular mission of the spacecraft 140. The spacecraft 140 may comprise one or more thrusters, rocket engines, or other propulsion devices for controlling the orientation thereof and/or for propelling the spacecraft 140 in space. In some embodiments, the spacecraft 140 may be independently capable of moving from one orbit to another orbit, while in other embodiments the spacecraft 140 may rely on the launch vehicle 102 and/or the second stage 124 to position the spacecraft 140 in a desired orbit.

Although the launch vehicle 102 is shown in FIG. 1A as comprising two stages, the present disclosure is not limited to two-stage launch vehicles. A launch vehicle according to some embodiments of the present disclosure may comprise only a single stage, while a launch vehicle according to other embodiments of the present disclosure may comprise more than two stages. In some embodiments, only the first stage 104 may be utilized to launch the launch vehicle 102 from Earth and insert the spacecraft 140 into a desired parking orbit and/or a final rendezvous orbit, while in other embodiments a plurality of stages may be expended to launch the launch vehicle 102 from Earth and insert the spacecraft 140 into a desired parking orbit and/or a final rendezvous orbit. In some embodiments, a second or other upper stage may not carry a separate spacecraft 140, but rather may be a spacecraft intended for in-space operations such as orbital rendezvous and docking/berthing.

The launch vehicle 102 may comprise (whether in or on the first stage 104, the interstage 120, the second stage 124, and/or the spacecraft 140), for example, location sensors, position sensors, speed sensors, attitude sensors, altitude sensors, heading sensors, heat sensors, fuel sensors, acceleration sensors, proximity sensors, optical sensors, and/or other sensors. The sensors may be active (e.g., require an external source of power to operate) or passive. The sensors may comprise one or more receivers for receiving signals from satellites, such as from GPS satellites, GLONASS satellites, and/or any other navigation system satellites. The sensors may comprise their own processors, memories, and other components for interpreting sensed data to yield interpreted data. The sensors may provide raw and/or interpreted data to one or more on-board and/or ground-based control units. Where raw and/or interpreted data is provided to a ground-based control unit, the launch system 100 may comprise one or more wireless transceivers for collecting data and transmitting the same to the ground-based control unit.

The ground control station 144 may comprise a control unit 150 such as that described in connection with FIG. 1B. The ground control station 144 may additionally or alternatively comprise: one or more user interfaces for displaying information to a user and for receiving inputs from a user; one or more processors; one or more computer-readable memories or other storage devices, in which may be stored one or more programs associated with launch, control, and/or recovery of a launch vehicle 102; and one or more communication interfaces (including for communicating with, for example, the launch vehicle 102, the spacecraft 140, one or more sensors of the launch system 100, a target satellite, a communications network such as a radio network and/or the Internet, and/or one or more tracking systems for tracking aerial and orbital objects).

Figure 1B:
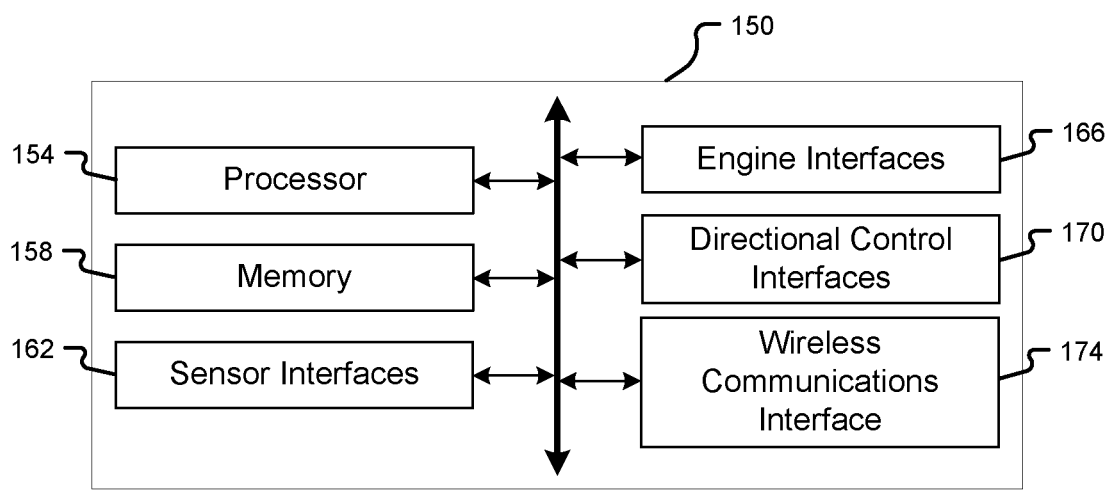
FIG. 1B shows a block diagram of a control unit according to embodiments of the present disclosure.

FIG. 1B provides a block diagram of a control unit 150 such as may be included in a launch vehicle 102, a spacecraft 140, and/or a ground control station 144 of a launch system 100 according to embodiments of the present disclosure. A control unit 150 in a launch vehicle 102 may be positioned in the first stage 104, in the second stage 124, or elsewhere in the launch vehicle 102. Where the control unit 150 is physically remote from the other components of the launch system 100 (e.g., when the control unit 150 is in the ground control station 144), the control unit 150 may be in wireless communication with the launch vehicle 102. In some embodiments, the launch system 100 may comprise a plurality of control units 150, including at least one control unit 150 on the launch vehicle 102 and/or the spacecraft 140, and at least one control unit 150 on the ground. In embodiments of the launch system 100 that comprise a plurality of control units 150, the control units 150 may utilize a predetermined and/or pre-programmed protocol to determine which control unit 150 may issue commands at any given time. For example, a ground station control unit 150 may have authority to issue commands until shortly before launch of the flight hardware, at which time authority to issue commands may be transferred to a flight control unit 150.

The control unit 150 comprises a processor 154, a memory or other computer-readable storage medium 158, one or more sensor interfaces 162, one or more engine interfaces 166, one or more directional control interfaces 170, and a wireless communications interface 174.

The processor 154 may correspond to one or multiple microprocessors of the control unit 150. The processor 154 may comprise a Central Processing Unit (CPU) on a single Integrated Circuit (IC) or on a plurality of IC chips. The processor 154 may be a multipurpose, programmable device that accepts digital data as input, processes the digital data according to instructions stored in its internal memory, and provides results as output. The processor 154 may implement sequential digital logic as it has internal memory. As with most known microprocessors, the processor 154 may operate on numbers and symbols represented in the binary numeral system.

Examples of the processor 154 as described herein may include, but are not limited to, at least one of Qualcomm® Snapdragon® 800 and 801, Qualcomm® Snapdragon® 620 and 615 with 4G LTE Integration and 64-bit computing, Apple® A12 Bionic® processor with 64-bit architecture, Apple® M12 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, and other industry-equivalent processors, and may perform computational functions using any known or future-developed standard, instruction set, libraries, and/or architecture.

The memory 158 may correspond to any type of non-transitory computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

In some embodiments, the memory 158 may comprise volatile or non-volatile memory and a controller for the same. The memory 158 stores any firmware needed for allowing the processor 154 to operate and/or communicate with the various components of the control unit 150, as needed. Whether separately or as part of such firmware, the memory 158 may store drivers for one or more of the components of the control unit 150. The memory 158 also stores instructions for execution by the processor 154, including instructions for execution by the processor 154 that enable the processor 154 to carry out the methods described herein.

The one or more sensor interfaces 162 of the control unit 150 are configured to facilitate the receipt at the processor 154 of data from, and/or the transmission of data (including control signals) from the processor 154 to, one or more sensors of the launch system 100. The processor 154 may utilize data received from one or more sensors of the launch system 100 to generate control signals for controlling the launch vehicle 102 and/or another aspect of the launch system 100. For example, based upon data received via the one or more sensor interfaces 162 from speed sensors, position sensors, attitude sensors, altitude sensors, and/or temperature sensors, the processor 154 may throttle the rocket engine 108 or 128; may steer the movable nozzle of the rocket engine 108 or 128; may ignite or cut off the rocket engine 108 or 128; and/or may initiate separation of the first stage 104, interstage 120, second stage 124, payload fairings 136, and/or spacecraft 140.

The one or more engine interfaces 166 of the control unit 150 are configured to facilitate the receipt at the processor 154 of data from, and/or the transmission of data (including control signals) from the processor 154 to, one or more engines 108, 128, one or more solid rocket boosters 116, and/or one or more other propulsion systems of the launch vehicle 102. The engine(s) 108, 128, solid rocket boosters 116, and/or other propulsion systems may be positioned on the launch vehicle 102 and/or the spacecraft 140. Each engine 108, 128, booster 116, and/or other propulsion system may comprise a dedicated engine/booster control unit with a processor, memory, and other components needed to properly control engine/booster operation. Alternatively, the control unit 150 may control engine operation directly. In either case, the control unit 150 may send control signals to the engine(s) 108, 128, boosters 116, and/or other propulsion system (whether to the dedicated engine control unit associated with each engine/booster/propulsion system or to one or more actuators on the engine(s)/booster(s)/propulsion system(s), as appropriate) for controlling the initiation and/or termination of each engine/booster/propulsion system burn, the throttle of each engine/booster/propulsion system, and/or other aspects of engine/booster/propulsion system operation.

The one or more directional control interfaces 170 are configured to facilitate the receipt of data at the processor 154 from, and/or the transmission of data (including control signals) from the processor 154 to, one or more directional control devices on the launch vehicle 102. For example, in some embodiments, the launch vehicle 102 may comprise one or more actuators for moving the nozzles of the rocket engine 108 and/or 128, so as to vector the thrust produced by the engine and steer the launch vehicle 102. In other embodiments, the launch vehicle 102 may comprise fins or other control surfaces that, while the launch vehicle 102 is traveling through the atmosphere, may be used to steer the launch vehicle 102. In still other embodiments, the launch vehicle 102 (or a portion thereof) may comprise thrusters for maneuvering the launch vehicle 102 (or a portion thereof) in space. Regardless of which directional control system(s) are utilized in the launch vehicle 102, the directional control interfaces 170 facilitate the receipt at the processor 154 of data from, and/or the transmission of data (including control signals) from the processor 154 to, the directional control system(s).

The wireless communications interface 174 comprises hardware for transmitting control signals and/or data to, and receiving control signals and/or data from, various components of the launch system 100 and/or other sources/destinations. The wireless communications interface 174 may comprise, for example, one or more radios (including transmitter(s), receiver(s), and antenna(s)) configured to operate at frequencies in the VHF band, UHF band, L band, S band, C band, X band, Ku band, and/or Ka band.

Figure 2A:
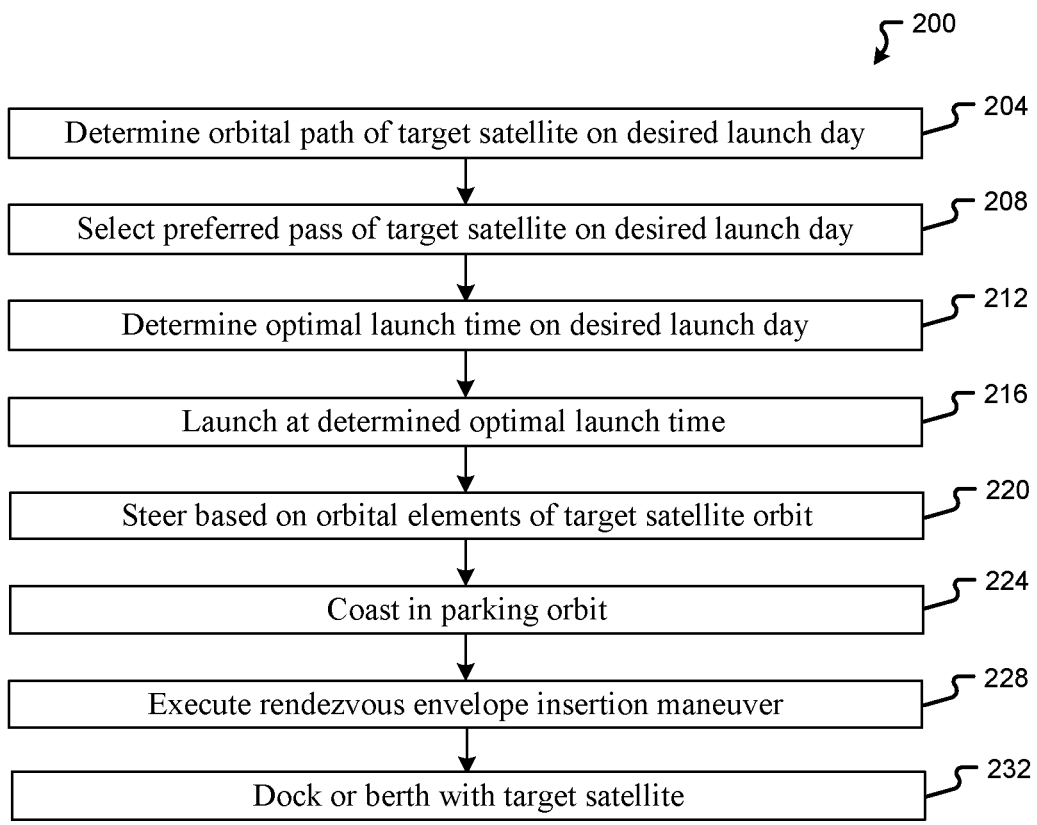
FIG. 2A shows a flow chart of a method according to embodiments of the present disclosure.

Turning now to FIG. 2A, an orbital rendezvous method 200 according to one embodiment of the present disclosure comprises determining the orbital path of a target satellite on a desired launch day (step 204). The method 200 is described with respect to a target satellite in a circular orbit but is useful as well for a target satellite in an elliptical orbit. For a satellite in low Earth orbit like the ISS, the orbital path of the satellite may comprise multiple orbits around the earth, with the path of each orbit offset by some amount from the path of other orbits that day. As a result, the orbital path of the target satellite in low Earth orbit may pass over and/or near a given launch site multiple times throughout the day. However, the orbital rendezvous method 200 of the present disclosure is not limited to use with satellites in low Earth orbit. Regardless of the type of orbit of a target satellite, the current orbital path of the target satellite may be determined, for example, using ground tracking sensors and/or based on signals received from the target satellite. Once the current orbital path of the target satellite is known, the current orbital path data may be propagated forward (e.g., an extrapolation may be made based on the current orbital path data) to determine the anticipated orbital path on the day of intended launch.

The orbital path of the target satellite may be described, for example, by the Keplerian elements and/or by orbital state vectors.

The method 200 also comprises identifying the preferred pass of the target satellite relative to the launch site location on the desired launch day (step 208). The preferred pass of the target satellite, for a given day, is the pass on that day during which orbital rendezvous may be achieved most efficiently (whether in terms of time or expended consumables). In many instances, the preferred pass of the target satellite will be the pass in which the perpendicular, straight-line distance from the ground track of the target satellite's orbit to the launch site is the shortest.

The method 200 further comprises determining the optimal launch time on the desired launch day (step 212). The optimal launch time for the method 200 is the time of launch that will enable insertion of the second stage 124 into the rendezvous envelope of the target satellite during the preferred pass of the target satellite on the desired launch day. The rendezvous envelope for a given target satellite, which is predetermined and specific to the target satellite, is the set of positions and velocities (defined relative to the target satellite) from which the second stage 124 or spacecraft 140 may begin a terminal rendezvous and docking or berthing sequence with the target satellite. Initiation of a terminal rendezvous and docking or berthing sequence of a second stage 124 or spacecraft 140 once established within the rendezvous envelope of a given target satellite may be characterized, for example, by a transition from using a terrestrial or celestial reference system to using the target satellite as the reference for navigation of the second stage 124 or spacecraft 140, by activation of onboard proximity and other sensors, and/or by a transition to using information from onboard proximity and other sensors to calculate needed control inputs. When the second stage 124 or spacecraft 140 is in the rendezvous envelope of a target satellite, the second stage 124 or spacecraft 140 is essentially flying in formation with the target satellite. In some embodiments, a rendezvous envelope may be defined by parameters such as a range of phase angles relative to the target satellite, a range of radial distances from the target satellite, and a range of velocities relative to the target satellite's velocity.

Where the target satellite is the ISS, for example, the rendezvous envelope encompasses a volume of space approximately 5-10 kilometers from the ISS, and velocities having substantially the same direction as, and a magnitude within 5-10 meters per second of, the direction and magnitude of the ISS's velocity.

For purposes of illustration, the second stage 124 (with the spacecraft 140) is assumed to be the portion of the launch vehicle 102 that must be inserted into the target satellite's rendezvous envelope in order to achieve orbital rendezvous of the spacecraft 140 and the target satellite. In other embodiments of the present disclosure, however, a greater or lesser portion of the launch vehicle 102 may need to be inserted into the target satellite's rendezvous envelope to enable orbital rendezvous of the spacecraft 140 with the target satellite.

To enable insertion of the second stage 124 or spacecraft 140 into the predetermined rendezvous envelope of the target satellite, the optimal launch time is determined to yield a target phase angle between the second stage 124 and the target satellite, on the target satellite's preferred pass on the desired launch day. The target phase angle is determined based on the target satellite's rendezvous envelope. Depending on the target satellite's rendezvous envelope, the target phase angle may be, for example, a five-degree lag behind the target satellite, or a three-degree lag behind the target satellite, or a one-degree lag behind the target satellite, or less than a one-degree lag behind the target satellite.

The phase angle is the angle (measured from the center of the Earth), within the orbital plane of the target satellite, between the target satellite and the second stage 124. While the total distance between the target satellite and the second stage 124 will depend on the altitudes and planes of the respective orbits of the target satellite and the second stage 124, all else being equal, a smaller phase angle represents a lesser distance while a greater phase angle represents a greater distance. Thus, all else being equal, the smaller the phase angle, the less time will be needed for the launch vehicle 102 or portion thereof to reach the target satellite's rendezvous envelope.

The method 200 further comprises launching the launch vehicle 102 at the determined optimal launch time (step 216). Launching the launch vehicle 102 at the determined optimal launch time may require or comprise initiating a launch sequence that causes the launch vehicle 102 to be launched at the determined optimal launch time. Launching at the optimal launch time for the desired launch day minimizes the resources (e.g. time, fuel, etc.) required to reach the target satellite's rendezvous envelope. While the launch vehicle 102 may be launched at a time other than the optimal launch time, any delay of the actual launch time from the optimal launch time will increase the resulting phase angle between the second stage 124 and/or spacecraft 140 and the target satellite. Moreover, if the target satellite's rendezvous envelope is slightly behind and below the target satellite, then launching earlier than the optimal launch time will have a more drastic negative effect on the efficiency of the launch and rendezvous than will launching later than the optimal launch time. This is because launching earlier than the optimal launch time could result in the second stage 124 being inserted just ahead of the target satellite, outside of the target satellite's rendezvous envelope and with a phase angle approaching 360 degrees. Launching shortly after the optimal launch time, on the other hand, will cause the second stage 124 to enter orbit farther behind the target satellite than desired (at a position that may or may not still be within the rendezvous envelope), but with a phase angle much closer to the desired phase angle than in the early launch case.

If the target satellite's rendezvous envelope is above and ahead of the target satellite, then launching later than the optimal launch time will have a more drastic negative effect on the efficiency of the launch and rendezvous than will launching earlier than the optimal launch time. This is because launching later than the optimal launch time could result in the second stage 124 being inserted into orbit just behind the target satellite, such that the phase angle to be closed during the rendezvous (by having the second stage drift back and down toward the target satellite) again approaches 360 degrees. Launching earlier than the optimal launch time, on the other hand, will cause the second stage 124 to enter orbit farther ahead of the target satellite than desired (at a position that may or may not still be within the rendezvous envelope), but with a phase angle much closer to the desired phase angle than in the late launch case.

Assuming that a launch vehicle 102 is launched later than the optimal launch time for a rendezvous envelope below and behind the target satellite, or is launched earlier than the optimal launch time for a rendezvous envelope above and ahead of the target satellite, the magnitude of the difference between the target phase angle and the phase angle actually achieved due to the deviation from the optimal launch time will increase as the difference between the optimal launch time and the actual time of launch increases. Thus, for example, a launch occurring within one second, or within 5 seconds, or within 10 seconds, or within 15 seconds of the optimal launch time will result in less error between the desired phase angle and the phase angle actually achieved than if the launch were to occur 50 seconds, or 55 seconds, or 1 minute from the optimal launch time.

Once the optimal launch time is determined in step 212, the optimal launch time may be programmed into the launch vehicle 102, and more specifically may be programmed into a control unit 150 of the launch vehicle 102. For the avoidance of doubt, the optimal launch time may be programmed into a ground control station 144, or the optimal launch time may be programmed directly into a control unit 150 installed in the first stage 104, the second stage 124, or another component of the launch vehicle 102.

According to the method 200, after launch and prior to rendezvous, the launch vehicle 102 steers out-of-plane as necessary based on the orbital elements of the target satellite's orbit (step 220). The launch vehicle 102 steers as necessary to achieve a parking orbit from which an efficient transition to the rendezvous envelope (after a coast period and subsequent rendezvous envelope insertion maneuver) may be accomplished. While such steering results in a less efficient path to orbit and therefore reduces the amount of payload that can be delivered as compared to a traditional launch profile or method (in which a launch vehicle is launched only when the orbital plane of the target satellite passes through the launch site, such that minimal or no out-of-plane steering is necessary to achieve the desired orbital plane), the use of fuel and/or other resources to steer the launch vehicle 102 enables the launch vehicle 102 to be launched on any day while minimizing the amount of time that the launch vehicle 102 (or portion thereof) must remain in orbit prior to achieving rendezvous with the target satellite.

The steering of the launch vehicle 102 may be accomplished according to a steering profile that is loaded into a control unit 150 of the launch vehicle 102 along with other flight software parameters prior to launch. The steering may be accomplished during any period of time after launch and up to and including rendezvous envelope insertion. The second stage 124 (or other appropriate component of the launch vehicle 102) may navigate to the parking orbit using a closed loop guidance algorithm in the control unit 150.

Once the launch vehicle 102 has steered to the parking orbit, the second stage 124 and/or spacecraft 140 coast(s) in the parking orbit (step 224) for as long as necessary until a rendezvous envelope insertion maneuver (which may be, in some embodiments, a near-impulsive maneuver) may be executed to bring the second stage 124 and/or the spacecraft 140 into the desired rendezvous envelope. In some embodiments, the second stage 124 and/or spacecraft 140 may coast in the parking orbit for less than a full orbit of the Earth, or about half of one orbit of the Earth, or less than half of one orbit of the Earth. Also in some embodiments, the parking orbit may be an elliptical orbit in which the second stage 124 and/or spacecraft 140 gains altitude as it coasts. At the time of the rendezvous envelope insertion maneuver, the second stage 124 may be within or near the volume of the desired rendezvous envelope, but may not have a velocity (including magnitude and direction) required to be within the desired rendezvous envelope. A control unit 150 associated with the second stage 124 and/or the spacecraft 140 may control how long the second stage 124 and/or spacecraft 140 remains in the parking orbit, based on pre-programmed data and/or algorithms.

The method 200 further comprises executing a rendezvous envelope insertion maneuver to enter the rendezvous envelope of the target satellite (step 228). The maneuver may comprise, for example, burning the second stage rocket engine 128 for a limited period of time, with the second stage 124 oriented such that the engine burn will give the second stage 124 a velocity within the rendezvous envelope, and/or so that the engine burn will push the second stage 124 into the volume of the rendezvous envelope (if the second stage 124 is not already within that volume). The maneuver may alternatively comprise utilizing one or more rocket engines or thrusters on the spacecraft 140 to insert the spacecraft 140 into the rendezvous envelope. A control unit 150 associated with the second stage 124 or the spacecraft 140 may control engine ignition, engine throttle, and burn duration for the rendezvous envelope insertion maneuver, based on criteria, data, and/or algorithms pre-programmed into the control unit 150.

As the rendezvous envelope insertion maneuver of step 228 may result in a large and rapid change in the velocity and orbit of the second stage 124 and/or the spacecraft 140, a control unit 150 controlling the maneuver may cause the maneuver to commence at a time, and/or may steer the second stage 124 and/or the spacecraft 140 during the maneuver, and/or may cause the maneuver to terminate at a time, such that the second stage 124 and/or the spacecraft 140, at the end of the maneuver, is within the rendezvous envelope but still far enough away from the target satellite to yield a low likelihood of inadvertent contact with the target satellite. In some embodiments, once the maneuver is complete, the spacecraft 140 may separate from the second stage 124 (or vice versa).

Once the second stage 124 and/or spacecraft 140 is within the rendezvous envelope, the second stage 124 and/or the spacecraft 140 may execute one or more maneuvers to adjust the orbit of the second stage 124 and/or of the spacecraft 140 to more precisely match that of the target satellite. The second stage 124 and/or the spacecraft 140 may also move within the rendezvous envelope from a position farther from the target satellite to a position closer to the target satellite. The second stage 124 and/or the spacecraft 140 may enter the rendezvous envelope in as few as, for example, five minutes, or six minutes, or eight minutes, or ten minutes, or twenty minutes after launch of the launch vehicle 102. The second stage 124 and/or the spacecraft 140 may enter the rendezvous envelope before the target satellite has completed one full or complete orbit from its position at the optimal launch time.

The method 200 also comprises docking or berthing with the target satellite (step 232). The docking may be accomplished autonomously by the second stage 124 and/or the spacecraft 140 under the control of a control unit 150, or the docking may be accomplished manually based on signals sent to and received via a control unit 150. In some embodiments, the spacecraft 140 may have separated from the second stage 124 prior to or upon reaching the rendezvous envelope, and may perform fine-control maneuvers to dock with the target satellite. In other embodiments, the second stage 124 may be provided with fine control thrusters and docking sensors and may itself perform the fine-control maneuvers necessary to dock with the target satellite. The docking may comprise use of the target satellite as a reference for navigation of the second stage 124 or spacecraft 140; activation of onboard proximity and other sensors; and/or calculation of control inputs using information from onboard proximity and other sensors.

In some embodiments, the docking with the target satellite may be replaced by berthing with the target satellite. The berthing may comprise the second stage 124 or spacecraft 140 approaching within 20 meters, or within 10 meters, or within 5 meters, or within 2 meters, or within 1 meter, of the target satellite; achieving a velocity that is within 1 meter per second or less, or 50 centimeters per second or less, or 30 centimeters per second or less, or 10 centimeters per second or less, of the velocity of the target satellite; and being captured by a robotic arm of the target satellite that moves the second stage 124 or spacecraft 140 to a docking port on the target satellite.

The mathematical computations necessary to determine the orbital path of the target satellite on the desired launch day (step 204), identify the preferred pass of the target satellite on the desired launch day (step 208), determine the optimal launch time on the desired launch day (step 216), calculate how much to steer out-of-plane during launch based on orbital elements of the target satellite's orbit to achieve a parking orbit (in connection with step 220), determine how long to coast in the parking orbit (in connection with step 224), calculate the time of ignition, throttle required, burn length required, and necessary orientation of the second stage 124 or the spacecraft 140 for the rendezvous envelope insertion maneuver (in connection with step 228), and dock or berth with the target satellite (in connection with step 232) are familiar to those of ordinary skill in the art, although the combination of steps included within the method 200 is not known to those of ordinary skill in the art. As a result, the mathematical computations associated with the various steps of the method 200 are not described herein.

Although the method 200 is described herein as corresponding to a two-burn launch profile, this description is not intended, and should not be understood, to limit the method 200 to execution by or with a two-stage launch vehicle 102. For example, a three-stage launch vehicle may utilize two stages (with each stage completing an engine burn) to reach the parking orbit of the method 200, and the third stage completing an engine burn to execute the rendezvous envelope insertion maneuver of step 228 of the method 200. In this example, three engine burns are conducted in the course of carrying out the method 200. However, the first two engine burns are substantially continuous, separated only by the amount of time necessary to detach the second stage from the first stage and ignite the engine(s) of the second stage. Thus, the method 200 encompasses a launch vehicle 102 that executes a single continuous engine burn to reach the parking orbit, or multiple separate engine burns separated only by the time required to execute a stage change, and treats either scenario as one engine burn. Similarly, if two or more stages are required to complete the rendezvous envelope insertion maneuver of step 228, those stages would be considered, for purposes of the present disclosure, to be executing a single engine burn if the only gap in the engine burn were for the amount of time necessary to execute a stage change (including stage separation and engine ignition). On the other hand, a first burn by a first stage or by a first and second stage, after which the launch vehicle coasts in a parking or phasing orbit prior to a second burn by the first stage or by the second stage, does not constitute a single burn for purposes of the present disclosure.

Figure 2B:
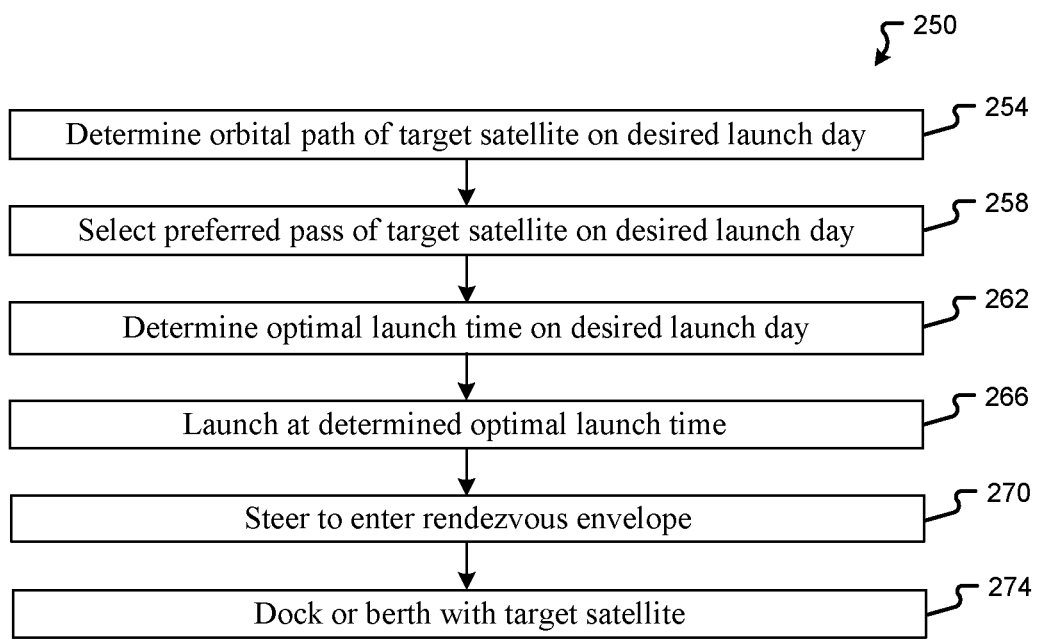
FIG. 2B shows a flow chart of another method according to embodiments of the present disclosure.

With reference now to FIG. 2B, an orbital rendezvous method 250 according to one embodiment of the present disclosure enables rendezvous to be achieved with only one engine burn and without utilizing a parking orbit. As with the method 200, the method 250 is described with respect to a target satellite in a circular orbit, but is useful as well for a target satellite in an elliptical orbit. The method 250 comprises determining the orbital path of a target satellite on a desired launch day (step 254). For a satellite in low Earth orbit like the ISS, the orbital path of the satellite may comprise multiple orbits around the earth, with the path of each orbit offset by some amount from the path of other orbits that day. As a result, the orbital path of the target satellite in low Earth orbit may pass over and/or near a given launch site multiple times throughout the day. However, the orbital rendezvous method 250 of the present disclosure is not limited to use with satellites in low Earth orbit. Regardless of the type of orbit of a target satellite, the current orbital path of the target satellite may be determined by, for example, using ground tracking sensors and/or based on signals received from the target satellite. Once the current orbital path of the target satellite is known, the current orbital path data may be propagated forward (e.g., an extrapolation may be made based on the current orbital path data) to determine the anticipated orbital path on the day of intended launch.

The orbital path of the target satellite may be described, for example, by the Keplerian elements and/or by orbital state vectors.

The method 250 also comprises identifying the preferred pass of the target satellite relative to the launch site location on the desired launch day (step 258). The preferred pass of the target satellite, for a given day, is the pass on that day during which orbital rendezvous may be achieved most efficiently (whether in terms of time or expended consumables). In many instances, the preferred pass of the target satellite will be the pass in which the perpendicular, straight-line distance from the ground track of the target satellite's orbit to the launch site is the shortest.

The method 250 further comprises determining the optimal launch time on the desired launch day (step 262). The optimal launch time for the method 250 is the time of launch that will enable insertion of the second stage 124 into the rendezvous envelope of the target satellite during the preferred pass of the target satellite on the desired launch day. The term rendezvous envelope when used in connection with the method 250 has the same meaning as when used in connection with the method 200, and the rendezvous envelope of the target satellite is determined prior to launch. Also, here as in the description of the method 200, for purposes of illustration, the second stage 124 (with the spacecraft 140) is assumed to be the portion of the launch vehicle 102 that must be inserted into the target satellite's rendezvous envelope in order to achieve orbital rendezvous of the spacecraft 140 and the target satellite. In other embodiments of the present disclosure, however, a greater or lesser portion of the launch vehicle 102 may need to be inserted into the target satellite's rendezvous envelope to enable orbital rendezvous of the spacecraft 140 with the target satellite).

To enable insertion of the second stage 124 or spacecraft 140 into the predetermined rendezvous envelope of the target satellite, the optimal launch time is determined to yield a target phase angle between the second stage 124 and the target satellite, on the target satellite's preferred pass on the desired launch day. The target phase angle is determined based on the target satellite's rendezvous envelope. Depending on the target satellite's rendezvous envelope, the target phase angle may be, for example, a five-degree lag behind the target satellite, or a three-degree lag behind the target satellite, or a one-degree lag behind the target satellite, or less than a one-degree lag behind the target satellite.

The method 250 further comprises launching the launch vehicle 102 at the determined optimal launch time (step 266). Launching the launch vehicle 102 at the determined optimal launch time may require or comprise initiating a launch sequence that causes the launch vehicle 102 to be launched at the determined optimal launch time. Launching at the optimal launch time for the desired launch day minimizes the resources (e.g. time, fuel, etc.) required to reach the target satellite's rendezvous envelope. As described above in connection with step 216 of the method 200, while the launch vehicle 102 may be launched at a time other than the optimal launch time, any deviation between the optimal launch time and the actual time of launch will increase the resulting phase angle between the second stage 124 and/or the spacecraft 140 and the target satellite, and decrease the efficiency of the launch and any subsequent rendezvous.

Once the optimal launch time is determined in step 262, the optimal launch time may be programmed into the launch vehicle 102, and more specifically may be programmed into a control unit 150 of the launch vehicle 102. For the avoidance of doubt, the optimal launch time may be programmed into a ground control station 144, or the optimal launch time may be programmed directly into a control unit 150 installed in the first stage 104, the second stage 124, or another component of the launch vehicle 102.

According to the method 250, after launch and prior to rendezvous, the launch vehicle 102 (or portion thereof) steers out-of-plane based on the orbital elements of the target satellite's orbit to reach and enter the rendezvous envelope (step 270). While such steering reduces the amount of payload that may be carried as compared to a traditional launch profile or method (in which a launch vehicle is launched only when the orbital plane of the target satellite passes through the launch site, such that minimal or no out-of-plane steering is necessary to achieve the desired orbital plane), the use of fuel and/or other resources to steer the launch vehicle 102 enables the launch vehicle 102 to be launched on any day while minimizing the amount of time that the launch vehicle 102 (or portion thereof) must remain in orbit prior to achieving rendezvous with the target satellite.

Unlike the method 200, the method 250 involves only a single burn that brings the second stage 124 (or other portion of the launch vehicle 102) directly into the rendezvous envelope of the target satellite.

The steering of the launch vehicle 102 may be accomplished according to a steering profile that is loaded into a control unit 150 of the launch vehicle 102 along with other flight software parameters prior to launch. The steering may be accomplished during any period of time after launch and up to and including rendezvous envelope insertion.

As the single-burn launch profile of the method 250 may result in a large and rapid change of orbital characteristics of the second stage 124 and/or the spacecraft 140 as the second stage 124 and/or the spacecraft 140 approaches the target satellite, a control unit 150 controlling the steering of the second stage 124 and/or of the spacecraft 140 may cause the second stage 124 and/or the spacecraft 140 to steer or otherwise maneuver so as to position the second stage 124 and/or the spacecraft 140 within the rendezvous envelope of the target satellite, but still far enough away from the target satellite to yield a low likelihood of inadvertent contact with the target satellite.

Whether in connection with entering the target satellite's rendezvous envelope or after entering the target satellite's rendezvous envelope, the second stage 124 and/or the spacecraft 140 may execute one or more maneuvers to adjust the orbit of the second stage 124 and/or of the spacecraft 140 to more precisely match that of the target satellite. Even after entering the target satellite's rendezvous envelope, the second stage 124 and/or the spacecraft 140 may move within the rendezvous envelope from a position farther from the target satellite to a position closer to the target satellite. The second stage 124 and/or the spacecraft 140 may enter the rendezvous envelope in as few as, for example, five minutes, or six minutes, or eight minutes, or ten minutes, or twenty minutes after launch of the launch vehicle 102. The second stage 124 and/or the spacecraft 140 may enter the rendezvous envelope before the target satellite has completed one full or complete orbit from its position at the optimal launch time.

The method 250 also comprises docking or berthing with the target satellite (step 274). The docking may be accomplished autonomously by the second stage 124 and/or the spacecraft 140 under the control of a control unit 150, or the docking may be accomplished manually based on signals received via a control unit 150. In some embodiments, the spacecraft 140 may have separated from the second stage 124 prior to or upon reaching the rendezvous envelope, and may perform fine-control maneuvers to dock with the target satellite. In other embodiments, the second stage 124 may be provided with fine control thrusters and docking sensors and may itself perform the fine-control maneuvers necessary to dock with the target satellite. The docking may comprise use of the target satellite as a reference for navigation of the second stage 124 or spacecraft 140; activation of onboard proximity and other sensors; and/or calculation of control inputs using information from onboard proximity and other sensors.

In some embodiments, the docking with the target satellite may be replaced by berthing with the target satellite. The berthing may comprise the second stage 124 or spacecraft 140 approaching within 20 meters, or within 10 meters, or within 5 meters, or within 2 meters, or within 1 meter, of the target satellite; achieving a velocity that is within 1 meter per second or less, or 50 centimeters per second or less, or 30 centimeters per second or less, or 10 centimeters per second or less, of the velocity of the target satellite; and being captured by a robotic arm of the target satellite that moves the second stage 124 or spacecraft 140 to a docking port on the target satellite.

The mathematical computations necessary to determine the orbital path of the target satellite on the desired launch day (step 254), identify the preferred pass of the target satellite on the desired launch day (step 258), determine the optimal launch time on the desired launch day (step 262), calculate how much to steer out-of-plane during launch based on orbital elements of the target satellite's orbit to reach the rendezvous envelope (in connection with step 270), and dock or berth with the target satellite (in connection with step 274) are familiar to those of ordinary skill in the art, although the combination of steps included within the method 250 is not known to those of ordinary skill in the art. As a result, the mathematical computations associated with the various steps of the method 250 are not described herein.

Although the method 250 is described herein as corresponding to a one-burn launch profile, this description is not intended, and should not be understood, to limit the method 250 to execution by or with a single-stage launch vehicle. For example, a multi-stage launch vehicle may utilize multiple stages (with each stage completing an engine burn) to achieve rendezvous with the target satellite, but would still be considered, for purposes of the present disclosure, to be executing a single engine burn as long as the only gap between the stage-specific engine burns extends for the time required to execute a stage change (including stage separation and engine ignition), as opposed to an intentional delay for purposes of, for example, coasting in a parking orbit.

Figure 3A:
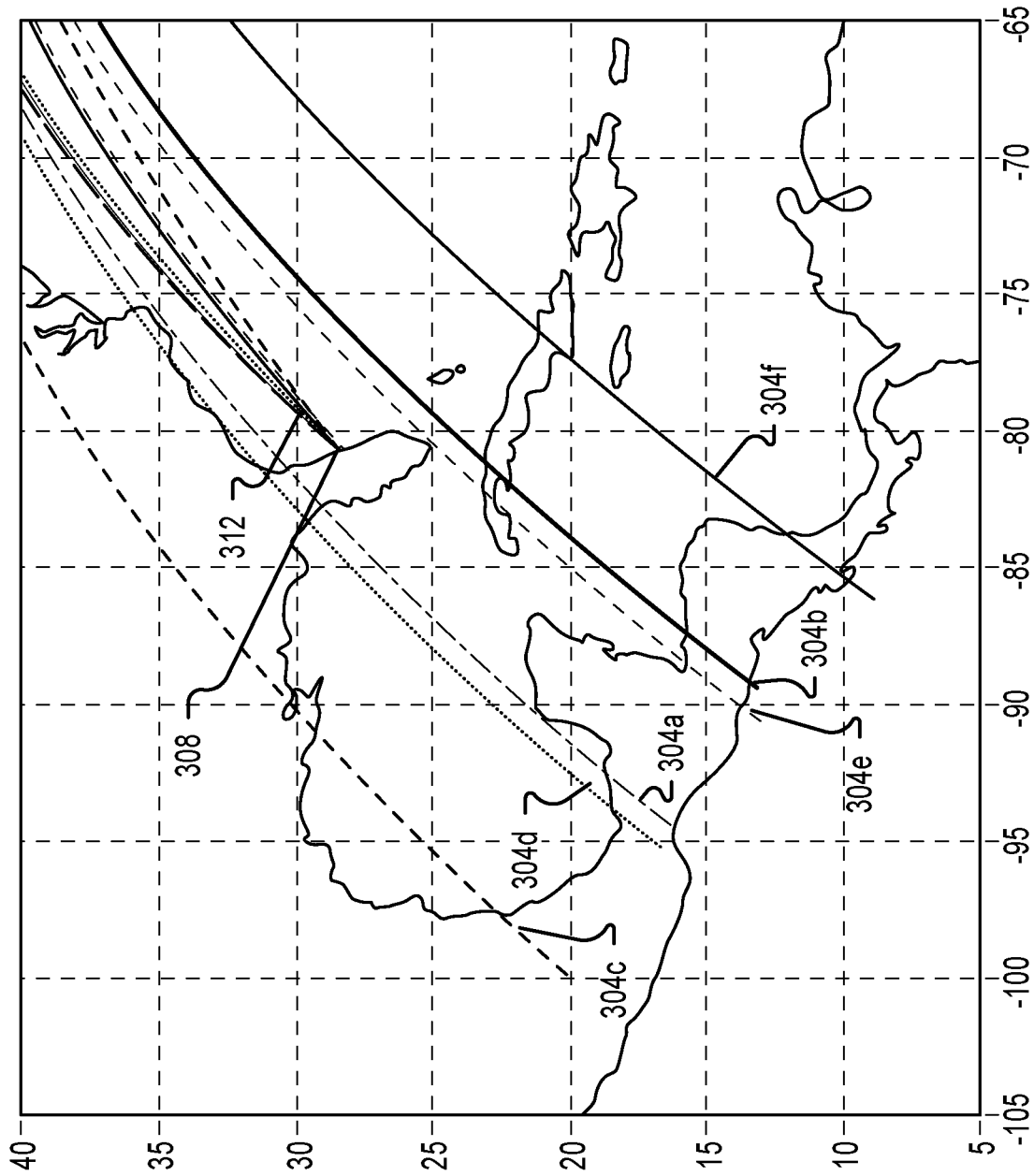
FIG. 3A shows a set of ground tracks of the ISS and a set of ground tracks of a launch system relative to a launch site according to embodiments of the present disclosure.

Turning now to FIG. 3A, six ground tracks 304a-304f of the ISS are depicted over Central and North America and the Atlantic Ocean, representing the preferred pass of the ISS relative to a launch site 308 in Cape Canaveral, Florida on each of six consecutive days. A plurality of launch tracks 312 show the corresponding ground tracks that a launch vehicle 102 would follow if launched according to the method 200 to rendezvous with the ISS while the ISS is following one of the ground tracks 304a-304f. The starting points of the ground tracks 304a-304f (e.g., near southern North America and Central America) indicate the position of the ISS on the day in question at the time of launch of a launch vehicle 102 from the launch site 308 pursuant to the method 200. Consistent with the description of the method 200 provided above, each ground track 304a-304f represents the preferred pass of the ISS relative to the launch site 308 on the day in question.

Figure 3B:
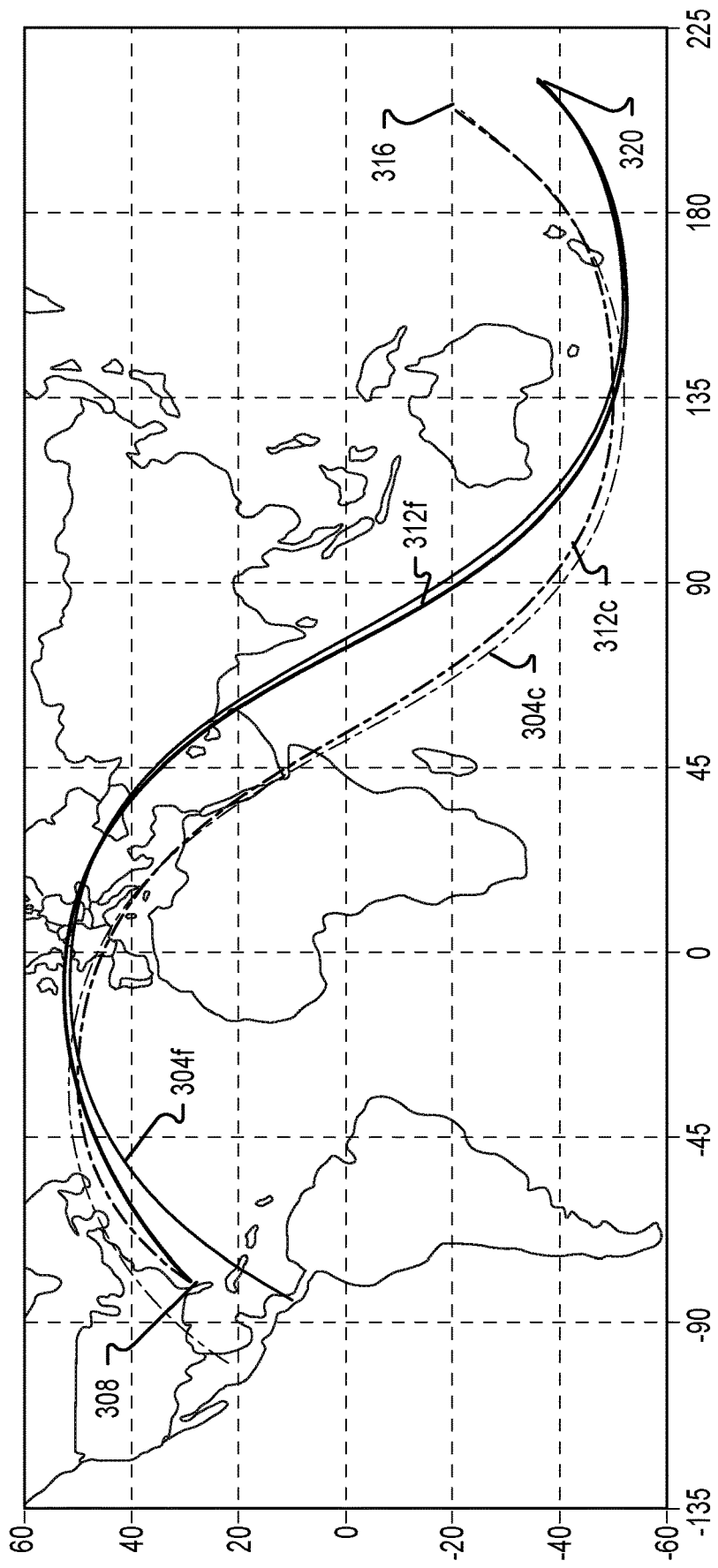
FIG. 3B shows a set of ground tracks of a launch system relative to a set of ground tracks of the ISS according to embodiments of the present disclosure.

FIG. 3B shows an expanded map of the Earth, with only the ISS ground tracks 304c and 304f overlaid thereon, together with the corresponding ground tracks 312c and 312f of a launch vehicle 102 launched from the launch site 308 to rendezvous with the ISS while the ISS is following the ground tracks 304c and 304f, respectively. As in FIG. 3A, the starting points of the ground tracks 304c and 304f (e.g., over southern North America and Central America, respectively) indicate the position of the ISS on the day of launch at the optimal time of launch as determined in step 212 of the method 200. The ground tracks 304c and 304f and the ground tracks 312c and 312f terminate over the Pacific Ocean at the position where a spacecraft 140 of the launch system 100 would reach the rendezvous envelope of the ISS if launched and flown according to the method 200. In other words, a spacecraft 140 launched with a launch vehicle 102 according to the method 200 on the day corresponding to the ground track 304c shown in FIG. 3B, and flown according to the method 200 so as to follow the ground track 312c, would reach the rendezvous envelope of the ISS at the point 316, in less than one orbit around the Earth. Similarly, a spacecraft 140 launched with a launch vehicle 102 according to the method 200 on the day corresponding to the ground track 304f shown in FIG. 3B, and flown according to the method 200 so as to follow the ground track 312f, would reach the rendezvous envelope of the ISS at the point 320, in less than one orbit around the Earth.

Figure 4:
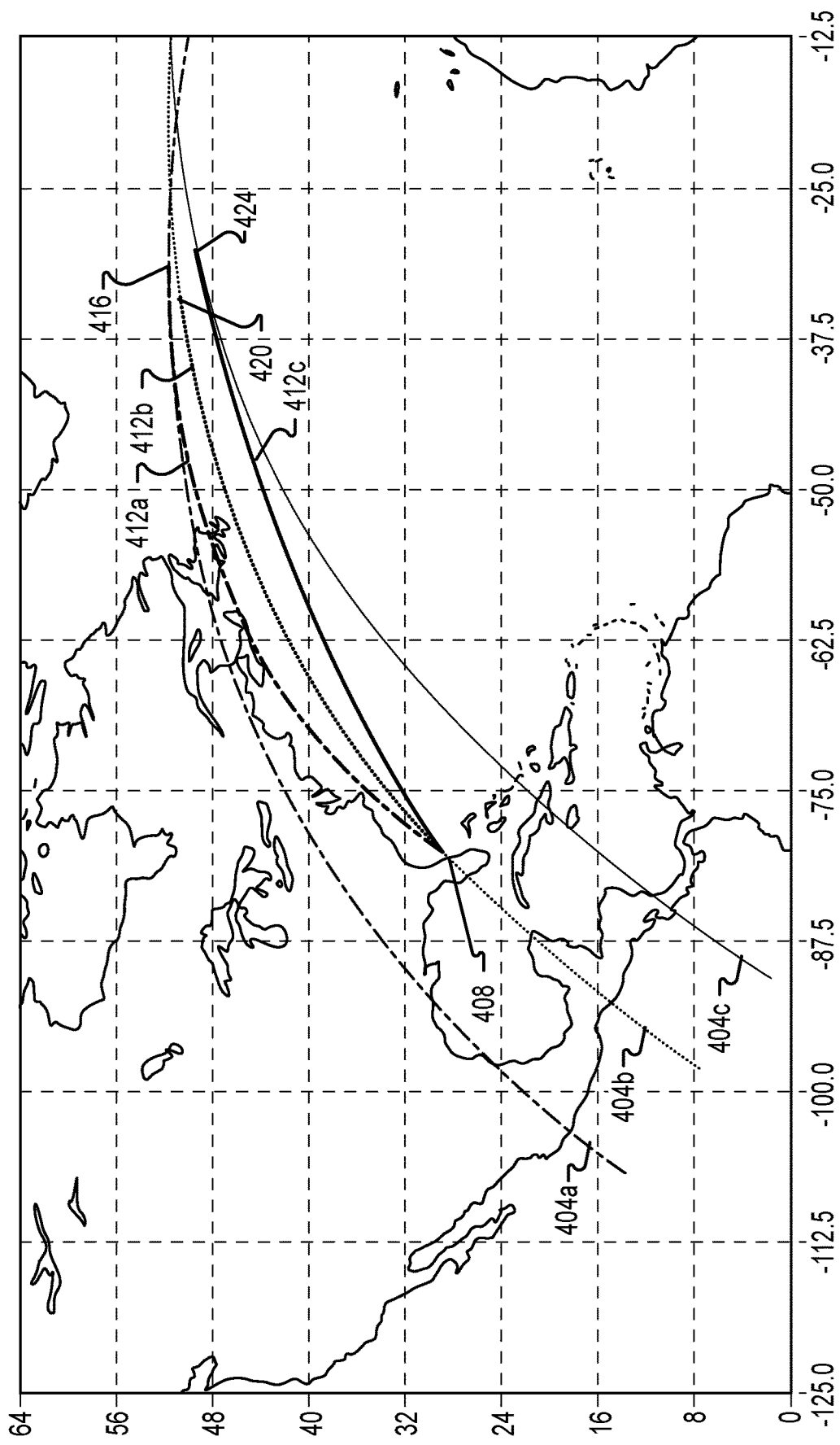
FIG. 4 shows a set of ground tracks of the ISS relative to a set of ground tracks of a launch system and relative to a launch site according to embodiments of the present disclosure.

FIG. 4 shows a map of a portion of the Earth, with three ISS ground tracks 404a, 404b, and 404c overlaid on the map. Here, the starting points of the ground tracks 404a, 404b, and 404c (e.g., southwest of southern North America and Central America) indicate the position of the ISS on the day of launch at the optimal time of launch as determined in step 262 of the method 250. The ground tracks 412a, 412b, and 412c correspond to the path of a launch vehicle 102 launched and flown according to the method 250 to rendezvous with the ISS while the ISS is following the ground tracks 404a, 404b, and 404c, respectively. Thus, the starting points of the ground tracks 412a, 412b, and 412c are at the launch site 408 in Cape Canaveral, Florida, and the ending points 416, 420, and 424 of the ground tracks 412a, 412b, and 412c, respectively are at the point of rendezvous envelope insertion of the second stage 124 and/or the spacecraft 140 with the ISS. As shown graphically in FIG. 4, launches that follow the method 250 may enter the target satellite's rendezvous envelope in much less than one orbit of the target satellite, which may, for example, correspond to a flight time from launch to rendezvous of as little as five minutes, or six minutes, or eight minutes, or ten minutes, or twenty minutes. The rendezvous may occur before the target satellite has completed one full or complete orbit from its position at the optimal launch time.

As may be seen in FIG. 4, a spacecraft such as the spacecraft 140 launched to rendezvous with the ISS while the ISS is following either of the ground tracks 404a and 404c must steer to achieve the same orbital plane as the ISS in addition to achieving the other orbital characteristics of the ISS's orbit, to the extent necessary to enter the rendezvous envelope of the ISS. In contrast, a spacecraft such as the spacecraft 140 launched to rendezvous with the ISS while the ISS is following the ground track 404b (which passes directly through the launch site 408) need not steer to achieve a different orbital plane. As a result, more of the performance capability of the launch vehicle 102 must be used to reach the rendezvous envelope of the target satellite when the target satellite is following a ground track that does not pass through the launch site 408 (such as the ground tracks 404a and 404c) than when the target satellite is following a ground track that does pass through the launch site 408. Either way, however, orbital rendezvous with the target satellite is achieved more quickly with launches that follow the methods 200 and 250 than with launches conducted using current methods.

Figure 5:
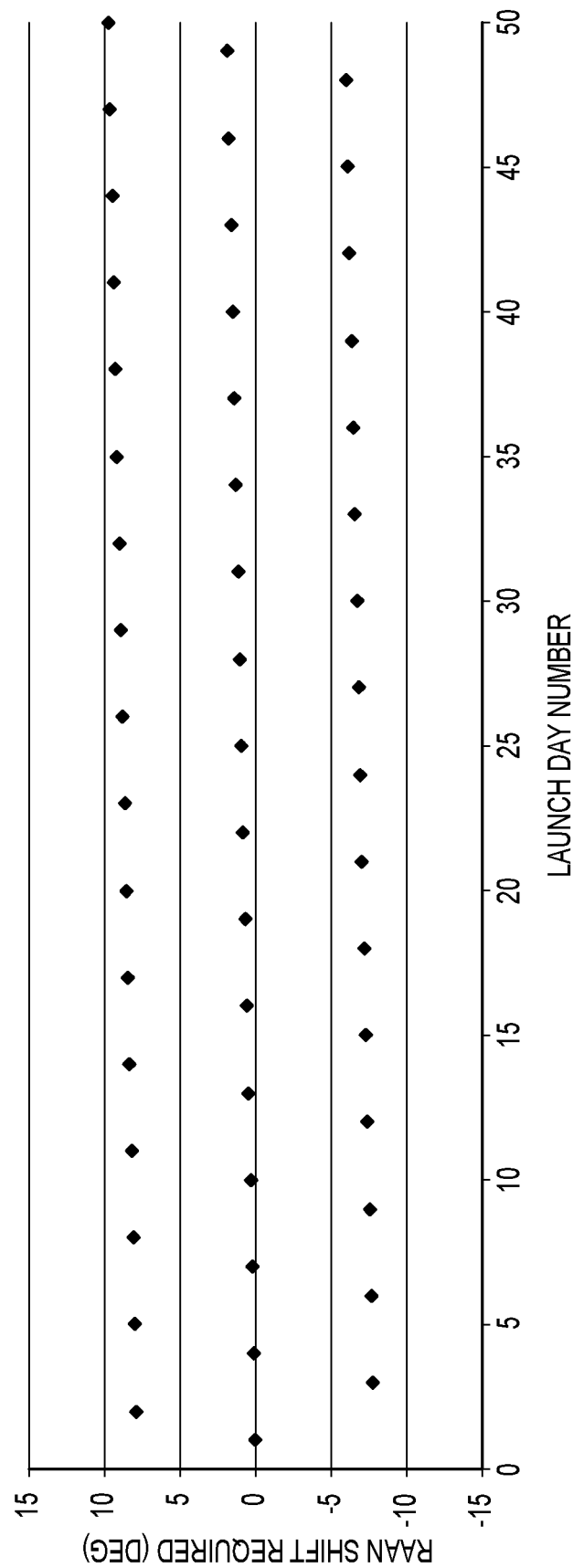
FIG. 5 is a graph showing the degrees of shift in right ascension of the ascending node (RAAN) needed to achieve orbital rendezvous relative to launch day number.

FIG. 5 shows, for fifty consecutive possible launch days (and, for purposes of illustration only, for the ISS as the target satellite), the variation in the degrees of RAAN shift required by a launch vehicle such as the launch vehicle 102 that is launched according to the method 200 or the method 250. As evident from FIG. 5, the RAAN shift required varies cyclically over time, with almost no RAAN shift required for a launch on day 1, approximately eight degrees of RAAN shift required for a launch on day 2, approximately negative eight degrees of RAAN shift required for a launch on day 3, and so forth. Over the fifty-day period shown in FIG. 5, the values shift upward, with approximately negative six degrees of RAAN shift required for a launch on day 48, approximately 2 degrees of RAAN shift required for a launch on day 49, and approximately 10 degrees of RAAN shift required for a launch on day 50. The variation in the amount of RAAN shift required results from the nature of the ISS's orbit, the ground track of which shifts continuously over time. For launch sites other than Cape Canaveral, Florida, for target satellites other than the ISS, and/or for target satellite orbits different than the ISS's orbit, a graph of RAAN shift required versus launch day number would be different. Even so, the need for accomplishing a RAAN shift during launch based on the ground track of the target satellite on the day of launch may remain regardless of the launch site, the target satellite, and/or the target satellite's orbit.

Figure 6:
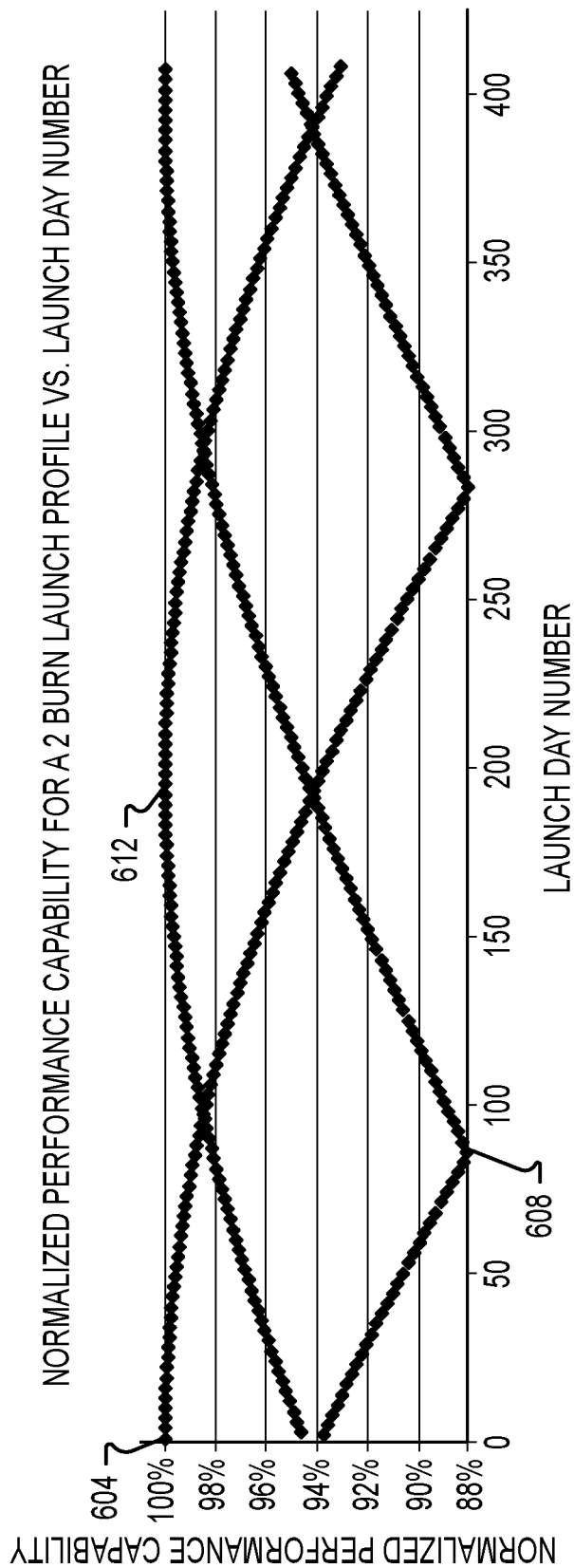
FIG. 6 is a graph showing the normalized performance capability of a launch system operated according to methods of the present disclosure relative to launch day number.

For a launch vehicle 102 operating according to the method 200 or 250, the amount of RAAN shift required to reach a target satellite's rendezvous envelope on a given day (as illustrated, for example, by FIG. 5) affects the percentage of the total performance capability of the launch vehicle 102 that may be allocated to carrying payload. In other words, a launch vehicle 102 launched according to the method 200 or the method 250 may not be able to carry as much payload as it would if it were being launched according to traditional launch methods due to the need to allocate some performance capability to accomplishing the RAAN shift required to reach the rendezvous envelope of the target satellite. FIG. 6 shows a graph of normalized performance capability for a two-burn launch profile (e.g., a launch profile according to the method 200) across a range of possible launch days. As is evident from the graph of FIG. 6, on some days (such as the days corresponding to points 604 and 612), a launch vehicle 102 may be able to allocate full performance capability to carrying a payload (where full performance capability is equivalent to the same amount of performance capability that may be allocated to carrying payload if the launch vehicle were launched according to traditional launch methods). This is because on the days in question, the target satellite's ground track passes directly through the launch site, and no RAAN shift is required. On most days, however, less than one hundred percent of full performance capability may be allocated to carrying payload when the launch vehicle 102 is launched according to the method 200. The percentage of full performance capability available for carrying payload during the approximately 400 days represented in FIG. 6 varies from approximately 88 percent (at point 608) to 100 percent. Notably, the graph of FIG. 6 is based on the use of a particular launch vehicle 102 with Cape Canaveral, Florida as the launch site and the ISS as the target satellite. The present disclosure is not limited, however, to the launch vehicle 102 in question, or to the use of Cape Canaveral, Florida as the launch site, or to the use of the ISS at the target satellite. Changes in one or more of the launch vehicle, the launch site and/or the target satellite (among other launch and flight parameters) may change the appearance of a graph of normalized performance capability versus launch day number. Even so, the graph of FIG. 6 demonstrates that launch and rendezvous according to the method 200 is possible on each day of a given year, with a significant percentage of full performance capability available on every day of the year.

Figure 7:
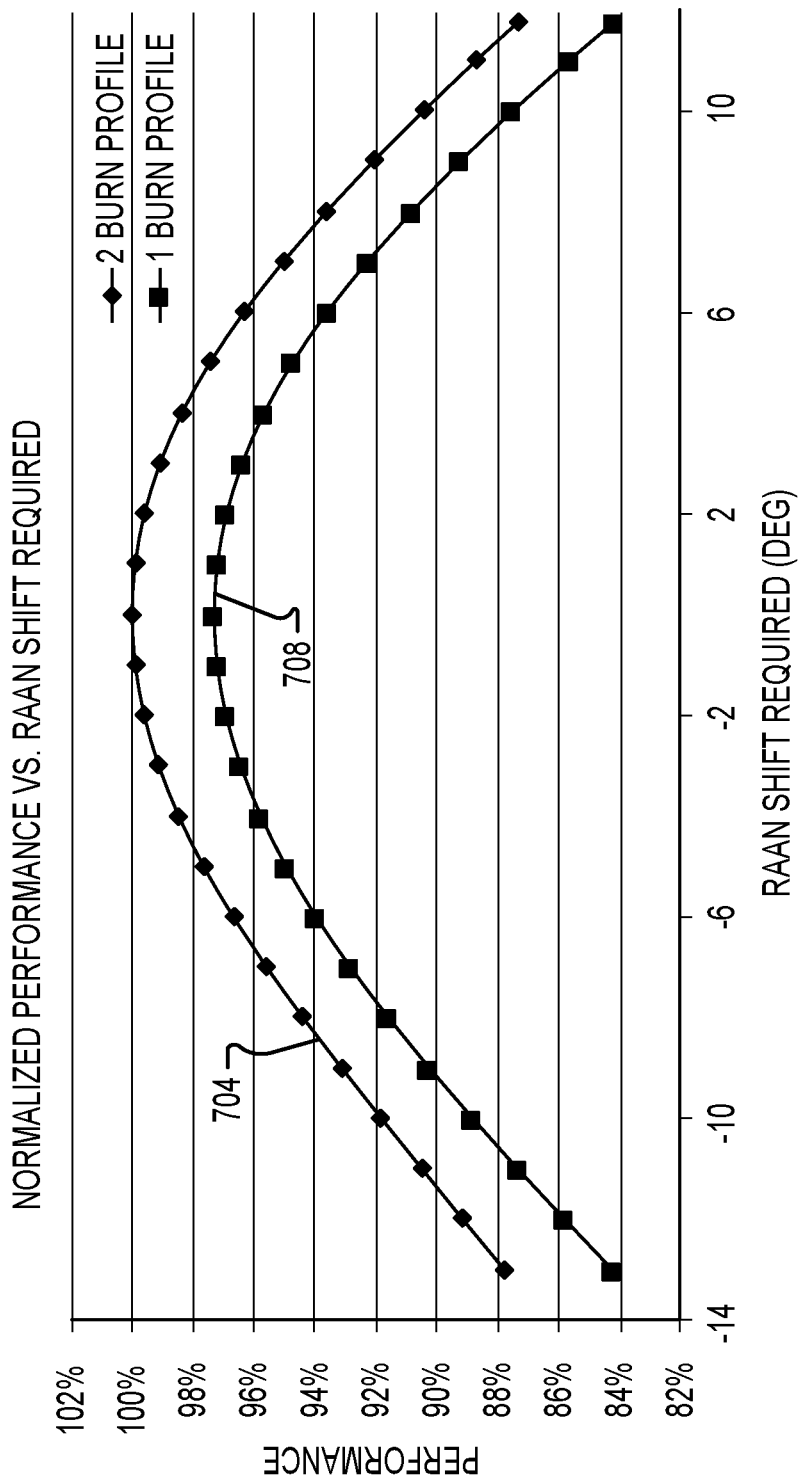
FIG. 7 is a graph comparing the normalized performance of launch systems executing two-burn and one-burn launch profiles relative to the degrees of RAAN shift required according to embodiments of the present disclosure.

FIG. 7 provides a comparison of the methods 200 (which utilizes a two-burn profile) and 250 (which utilizes a one-burn profile), in terms of normalized performance capability versus RAAN shift required. The curve 704 provides the normalized performance capability versus RAAN shift required for a launch vehicle 102 following the method 200, while the curve 708 provides the normalized performance capability versus RAAN shift required for a launch vehicle 102 following the method 250. Both curves represent the scenario involving a Cape Canaveral launch of a particular launch vehicle 102 for rendezvous with the ISS, although the present disclosure is not limited to this scenario. As can be seen in FIG. 7, for the example illustrated with the ISS as the target satellite, Cape Canaveral as the launch site, and a particular launch vehicle 102, the single-burn ascent of method 250 has approximately 3 percent less performance capability than the two-burn ascent of method 200 even when no RAAN shift is required. Furthermore, when significant amounts of RAAN shift are required (more than +/−10 degrees, for example) the difference in performance capability between method 250 and method 200 increases to approximately 4 percent. To use a specific example, if the amount of RAAN shift required for launch on a given day is negative six degrees, then approximately 97% of the performance capability of the launch vehicle 102 may be allocated for carrying payload if the launch vehicle 102 is launched according to the method 200 (with a two-burn profile), while approximately 94% of the performance capability of the launch vehicle 102 may be allocated for carrying payload if the launch vehicle 102 is launched according to the method 250 (with a one-burn profile). While the difference in available performance capability under the methods 200 and 250 is not negligible, in many instances the benefits of achieving a faster rendezvous by using the method 250 may outweigh the decrease in available performance capability associated with use of the method 250.

FIGS. 8A, 8B, 9A, and 9B each show three curves, one of which corresponds to launch on a day requiring maximum out-of-plane steering in one direction to reach the rendezvous envelope of a target satellite, another of which corresponds to launch on a day requiring maximum out-of-plane steering in an opposite direction to reach the rendezvous envelope of a target satellite, and the third of which corresponds to launch on a day requiring little or no out-of-plane steering. Each of the graphs in FIGS. 8A, 8B, 9A, and 9B is based on a given set of launch conditions, including launch of a particular launch vehicle 102 from Cape Canaveral, Florida for rendezvous with the ISS, although the present disclosure is not limited to these launch conditions.

Figure 8A:
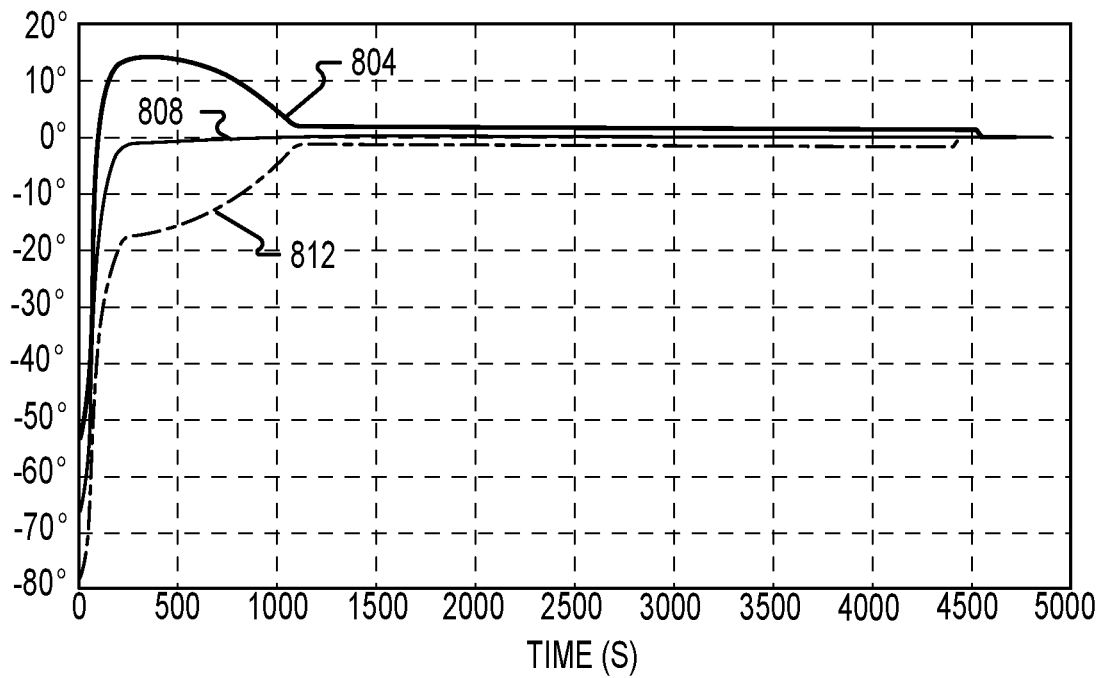
FIG. 8A shows the degrees of RAAN error over time (measured from the time of launch) for a two-burn launch profile according to embodiments of the present disclosure.
Figure 8B:
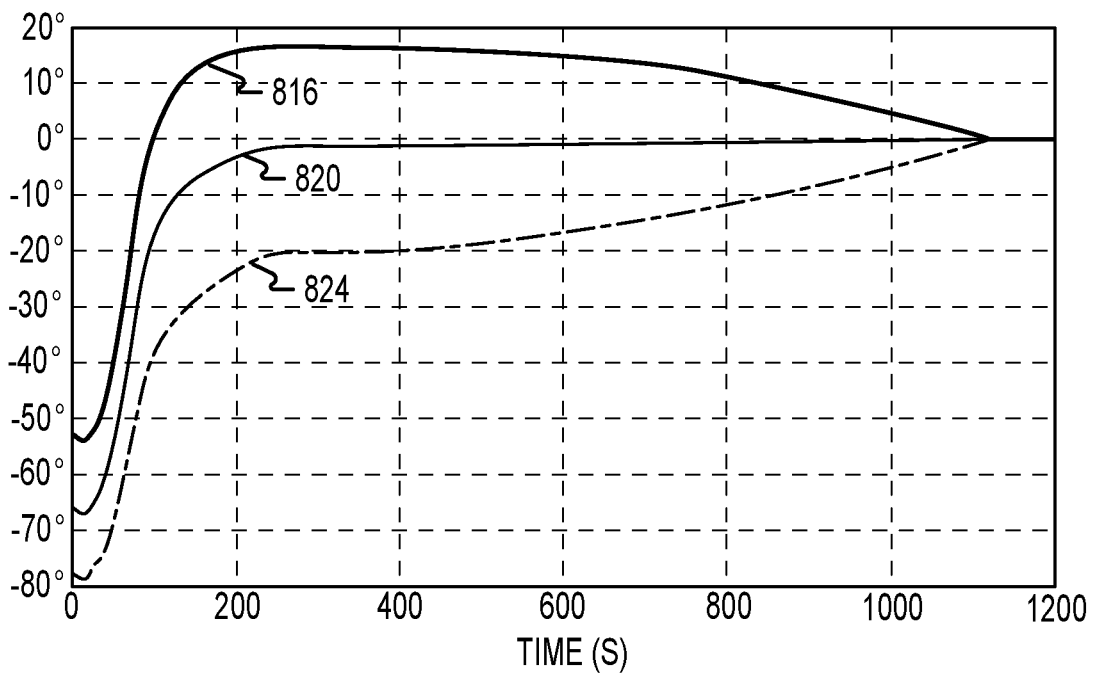
FIG. 8B shows the degrees of RAAN error over time (measured from the time of launch) for a one-burn launch profile according to embodiments of the present disclosure.

FIGS. 8A and 8B specifically show the RAAN error in degrees, over time, between the launch vehicle 102 or portion thereof and the target satellite's rendezvous envelope, both for a two-burn profile launch according to the method 200 (FIG. 8A) and for a one-burn profile launch according to the method 250 (FIG. 8B). In both figures, time "0" is the time of launch of the launch vehicle 102. Also in both figures, the depicted RAAN error changes drastically as the launch vehicle 102 accelerates into space (during an initial period comprising approximately the first 150-200 seconds after launch), after which the rate of change of the RAAN error slows. The discussion of FIGS. 8A and 8B below focuses primarily on the period having a slower rate of change in the RAAN error, after the initial period with the substantial rate of change in the RAAN error.

In FIG. 8A, the curves 804 and 812 demonstrate the decreasing RAAN error during the first burn (which takes the second stage 124 and/or the spacecraft 140 from launch to a parking orbit and lasts just over 1000 seconds), after which the RAAN error remains substantially constant while the second stage 124 and/or the spacecraft 140 remains in the parking orbit. When the second stage 124 and/or the spacecraft 140 executes the rendezvous envelope insertion maneuver to enter the rendezvous envelope (which happens around 4500 seconds in the graph of FIG. 8A), the RAAN error reaches zero. The curve 808, which represents launch of the launch vehicle 102 while the ground track of the target satellite is substantially aligned with the launch site, shows the initial burn reducing the RAAN error to substantially zero, where it remains as the second stage 124 coasts in the parking orbit and executes a rendezvous envelope insertion maneuver to enter the rendezvous envelope.

In FIG. 8B, the first and only engine burn of the launch vehicle 102 does not stop at a parking orbit, but rather continues until the rendezvous envelope of the target satellite is reached. As a result, the RAAN error depicted in FIG. 8B decreases continuously to zero for each of the curves 816, 820, and 824. Notably, although the different x-axis scales of FIGS. 8A and 8B affect the appearance of the curves provided therein, the curves 804, 808, and 812 are substantially similar to the curves 816, 820, and 824 from launch (time zero) until just past the 1000 second mark.

Figure 9A:
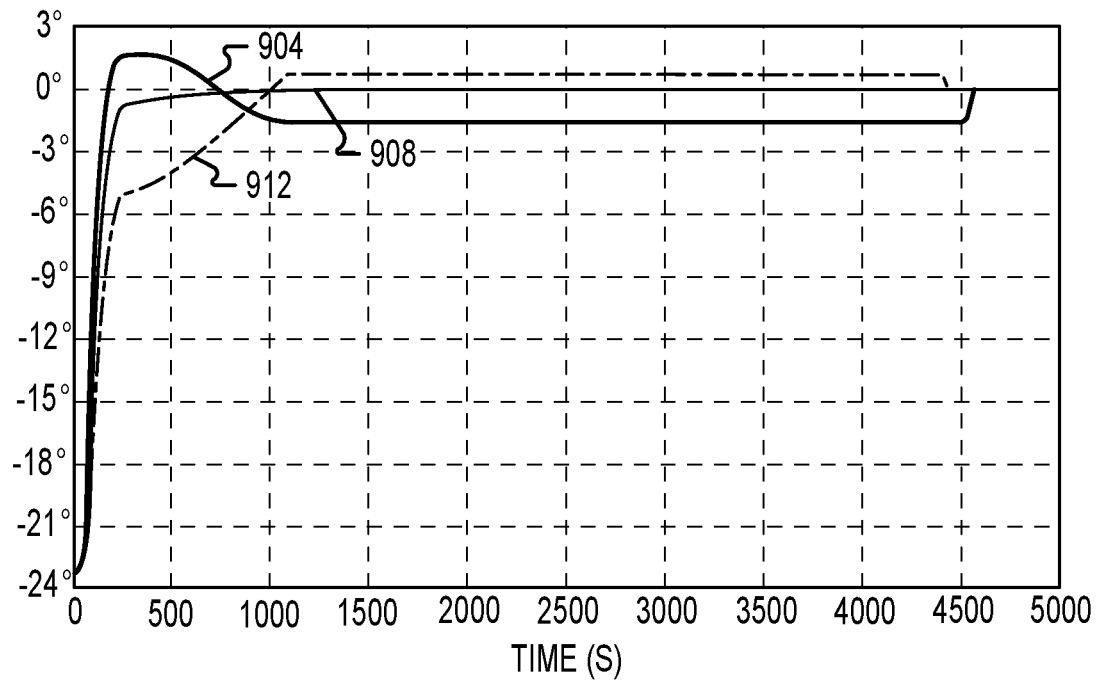
FIG. 9A shows the degrees of inclination error over time (measured from the time of launch) for a two-burn launch profile according to embodiments of the present disclosure.
Figure 9B:
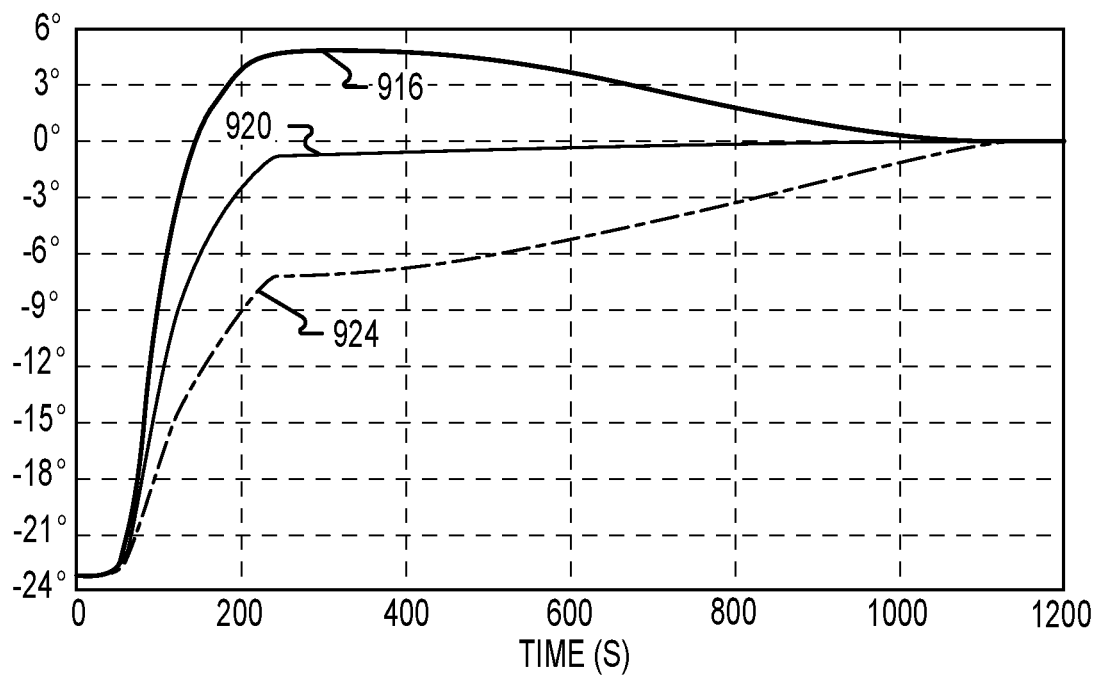
FIG. 9B shows the degrees of inclination error over time (measured from the time of launch) for a one-burn launch profile according to embodiments of the present disclosure.

FIGS. 9A and 9B specifically show the inclination error in degrees, over time, between the launch vehicle 102 or portion thereof and the target satellite, both for a two-burn profile launch according to the method 200 (FIG. 9A) and for a one-burn profile launch according to the method 250 (FIG. 9B). Here again, in both figures, time "0" is the time of launch of the launch vehicle 102. Also in both figures, the depicted inclination error changes drastically as the launch vehicle 102 accelerates into space (during an initial period comprising approximately the first 150-200 seconds after launch), after which the rate of change of the inclination error slows. The discussion of FIGS. 8A and 8B below focuses primarily on the period of slower change in the inclination error, after the initial period with its more substantial rate of change in the inclination error.

In FIG. 9A, the curves 904 and 912 show the inclination error during the first burn (which takes the second stage 124 and/or the spacecraft 140 from launch to a parking orbit and lasts just over 1000 seconds) changing from positive to negative (for curve 904) and from negative to positive (for curve 912), after which the inclination error remains substantially constant while the second stage 124 and/or the spacecraft 140 remains in the parking orbit. When the second stage 124 and/or the spacecraft 140 executes the rendezvous envelope insertion maneuver to enter the rendezvous envelope (which happens around 4500 seconds in the graph of FIG. 9A), the inclination error reaches zero. The curve 908, which represents launch of the launch vehicle 102 while the ground track of the target satellite is substantially aligned with the launch site, shows the initial burn reducing the inclination error to substantially zero, where it remains as the second stage 124 coasts in the parking orbit and executes a rendezvous envelope insertion maneuver to achieve the same orbit as the target satellite.

In FIG. 9B, the first and only burn of the launch vehicle 102 does not stop at a parking orbit, but rather continues until the launch vehicle 102 or portion thereof enters the rendezvous envelope of the target satellite. As a result, the inclination error depicted in FIG. 9B trends continuously toward zero (beginning approximately 250 to 300 seconds after launch) for each of the curves 916, 920, and 924.

As noted above, while FIGS. 5-9B provide example data for a particular launch vehicle in a particular configuration launched from a particular launch site (Cape Canaveral) for rendezvous with a particular target satellite (the ISS), the trends shown in FIGS. 5-9B may apply to any launch vehicle in any configuration launched from any launch site for rendezvous with any target satellite in low Earth orbit. More specifically, on days where the ground track of the target satellite is farther from the launch site at the optimal time of launch, any rocket or other launch vehicle will be required to maneuver to achieve a greater RAAN shift, with a corresponding impact on performance capability, than on days where the ground track of the target satellite is closer to the launch site at the optimal of launch. Moreover, the systems and methods disclosed herein are not limited to use with a target satellite in low Earth orbit.

The features of the various embodiments described herein are not intended to be mutually exclusive when the nature of those features does not require mutual exclusivity. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by use of the terms or phrases "for example," "such as," "by way of example," "e.g.," and other language commonly understood to indicate that what follows is an example.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments of the present disclosure include a method of achieving orbital rendezvous comprising: launching a spacecraft from a launch site at an optimal launch time of a given day, where the optimal launch time is selected to yield a target phase angle between the spacecraft and a target satellite on a preferred pass of the target satellite relative to the launch site on the given day, the target satellite orbiting in an orbital plane that does not pass through the launch site; steering the spacecraft toward a rendezvous envelope of the target satellite; and causing the spacecraft to enter the rendezvous envelope of the target satellite before the target satellite completes a full orbit from its position at the optimal launch time.

Aspects of the foregoing method include: inserting the spacecraft into a parking orbit; executing, from the parking orbit, a rendezvous envelope insertion maneuver to cause the spacecraft to enter the rendezvous envelope; docking or berthing the spacecraft with the target satellite; wherein a closed-loop guidance algorithm is used to insert the spacecraft into the parking orbit; wherein the parking orbit has an apogee between about 375 and 405 km; wherein the target satellite is the International Space Station; wherein the target satellite is in low Earth orbit; wherein the spacecraft is launched from the launch site aboard a two-stage launch vehicle; wherein a second stage of the two-stage launch vehicle executes a rendezvous envelope insertion maneuver; and wherein a second stage of the two-stage launch vehicle carries the spacecraft.

Embodiments of the present disclosure also include a launch system comprising: a launch vehicle comprising a lower stage and an upper stage; and a control unit. The control unit comprises: a processor; a communication interface; and a memory. The memory stores instructions for execution by the processor that, when executed, cause the processor to: initiate launch of the launch vehicle from a launch site at an optimal time of a selected day, the optimal time coinciding with a target phase angle between the launch vehicle and a target satellite, the target satellite having an orbit in an orbital plane that does not pass through the launch site, the orbit defined by orbital elements; issue out-of-plane steering commands based on the orbital elements; and execute an engine burn that causes at least the upper stage to enter, in less than one complete orbit of the target satellite from the optimal launch time, a rendezvous envelope of the target satellite.

Aspects of the foregoing launch system include: wherein the memory stores additional instructions for execution by the processor that, when executed by the processor, cause the processor to control a trajectory of the launch vehicle to insert at least the upper stage into a parking orbit, and further wherein the engine burn comprises a rendezvous envelope insertion maneuver sufficient to cause the upper stage to enter the rendezvous envelope; wherein controlling the trajectory of the launch vehicle to insert at least the upper stage into the parking orbit comprises executing a closed-loop guidance algorithm; wherein the memory stores additional instructions for execution by the processor that, when executed by the processor, cause the processor to: delay initiation of the rendezvous envelope insertion maneuver by the upper stage until a predetermined amount of time has passed after insertion of the upper stage into the parking orbit; wherein the optimal time further coincides with a preferred pass of the target satellite relative to the launch site on the selected day; wherein the upper stage carries a spacecraft, and further wherein the memory stores additional instructions for execution by the processor that, when executed by the processor, cause the processor to: initiate separation of the spacecraft from the upper stage in the rendezvous envelope; and wherein the launch vehicle comprises the control unit.

Embodiments of the present disclosure further include a method of rendezvousing with a target satellite, comprising: initiating a launch sequence to achieve launch of a launch vehicle from a launch site based on an optimal time, the optimal time determined to yield a predetermined phase angle between the launch vehicle and a target satellite; causing the launch vehicle to steer during launch toward a predetermined rendezvous envelope of the target satellite, wherein the target satellite has an orbit defining an orbital plane that does not pass through the launch site at the optimal time; and inserting at least a portion of the launch vehicle into the rendezvous envelope of the target satellite before the target satellite completes one complete orbit from the target satellite's position at the optimal time.

Aspects of the foregoing method include: controlling the launch vehicle to insert the at least a portion of the launch vehicle into a parking orbit at an altitude lower than a target altitude of the target satellite; initiating a rendezvous envelope insertion maneuver to enter the rendezvous envelope from the parking orbit; and wherein the launch vehicle carries a spacecraft, and the method further comprises causing the spacecraft to dock or berth with the target satellite.

The present disclosure encompasses any one or more of the aspects/embodiments as substantially disclosed herein.

The present disclosure also encompasses any one or more of the aspects/embodiments as substantially disclosed herein, optionally in combination with any one or more other aspects/embodiments as substantially disclosed herein.

The present disclosure further encompasses one or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method of achieving orbital rendezvous comprising:
launching a spacecraft from a fixed launch site at an optimal launch time of a given day, where the optimal launch time is selected to yield a target phase angle between the spacecraft and a target satellite on a preferred pass of the target satellite relative to the launch site on the given day, the target satellite orbiting in an orbital plane that does not pass through the launch site;
using a 2-burn launch profile of the launch vehicle to first insert the spacecraft into a parking orbit with a first burn; and
executing, from the parking orbit, a rendezvous envelope insertion maneuver with a second burn to cause the spacecraft to enter a rendezvous envelope before the target satellite completes a full orbit from its position at the optimal launch time.

2. The method of claim 1, wherein a closed-loop guidance algorithm is used to insert the spacecraft into the parking orbit.

3. The method of claim 1, wherein the parking orbit has an apogee between about 375 and 450 km.

4. The method of claim 1, further comprising:
docking or berthing the spacecraft with the target satellite.

5. The method of claim 1, wherein the target satellite is the International Space Station.

6. The method of claim 1, wherein the target satellite is in low Earth orbit.

7. The method of claim 1, wherein the spacecraft is launched from the launch site aboard a two-stage launch vehicle.

8. The method of claim 7, wherein a second stage of the two-stage launch vehicle executes a rendezvous envelope insertion maneuver.

9. The method of claim 7, wherein a second stage of the two-stage launch vehicle carries the spacecraft.

10. A launch system comprising:
a launch vehicle comprising a lower stage and at least one upper stage; and
a control unit comprising:
a processor;
a communication interface; and
a memory, the memory storing instructions for execution by the processor that, when executed, cause the processor to:
initiate launch of the launch vehicle from a fixed launch site at an optimal time of a selected day, the optimal time coinciding with a target phase angle between the launch vehicle and a target satellite, the target satellite having an orbit in an orbital plane that does not pass through the launch site, the orbit defined by orbital elements;
issue out-of-plane steering commands based on the orbital elements; and
execute two engine burns that cause at least the at least one upper stage to enter, in less than one complete orbit of the target satellite from the optimal launch time, a rendezvous envelope of the target satellite.

11. The launch system of claim 10, wherein the memory stores additional instructions for execution by the processor that, when executed by the processor, cause the processor to control a trajectory of the launch vehicle to insert at least the upper stage into a parking orbit, and further wherein the engine burn comprises a rendezvous envelope insertion maneuver sufficient to cause the at least one upper stage to enter the rendezvous envelope.

12. The launch system of claim 11, wherein controlling the trajectory of the launch vehicle to insert at least the at least one upper stage into the parking orbit comprises executing a closed-loop guidance algorithm.

13. The launch system of claim 11, wherein the memory stores additional instructions for execution by the processor that, when executed by the processor, cause the processor to:
  delay initiation of the rendezvous envelope insertion maneuver by the at least one upper stage until a predetermined amount of time has passed after insertion of the upper stage into the parking orbit.

14. The launch system of claim 10, wherein the optimal time further coincides with a preferred pass of the target satellite relative to the launch site on the selected day.

15. The launch system of claim 10, wherein the at least one upper stage carries a spacecraft, and further wherein the memory stores additional instructions for execution by the processor that, when executed by the processor, cause the processor to:
  initiate separation of the spacecraft from one of the at least one upper stage in the rendezvous envelope.

16. The launch system of claim 10, wherein the launch vehicle comprises the control unit.

17. A method of rendezvousing with a target satellite, comprising:
  initiating a launch sequence to achieve launch of a launch vehicle from a fixed launch site based on an optimal time, the optimal time determined to yield a predetermined phase angle between the launch vehicle and a target satellite;
  causing the launch vehicle to steer during launch toward a predetermined rendezvous envelope of the target satellite via a 1-burn launch profile, wherein the target satellite is orbiting in an orbital plane that does not pass through the launch site at the optimal time; and
  inserting at least a portion of the launch vehicle into the rendezvous envelope of the target satellite before the target satellite completes one complete orbit from the target satellite's position at the optimal time.

18. The method of claim 17, further comprising:
  controlling the launch vehicle to insert the at least a portion of the launch vehicle directly into the rendezvous envelope of the target satellite.

19. The method of claim 17, wherein the launch vehicle carries a spacecraft, and the method further comprises:
  causing the spacecraft to dock or berth with the target satellite.

* * * * *